(12) United States Patent
Inuzuka et al.

(10) Patent No.: US 10,090,704 B2
(45) Date of Patent: Oct. 2, 2018

(54) DISPLAY DEVICE AND DISPLAY METHOD OF ELECTRIC POWER SYSTEM INFORMATION

(75) Inventors: Tatsuki Inuzuka, Tokyo (JP); Takashi Matsubara, Tokyo (JP); Yuichi Kurosawa, Tokyo (JP); Kenta Tsukijishin, Tokyo (JP); Hideyuki Kobayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 127 days.

(21) Appl. No.: 14/377,021

(22) PCT Filed: Feb. 21, 2012

(86) PCT No.: PCT/JP2012/054169
§ 371 (c)(1),
(2), (4) Date: Aug. 6, 2014

(87) PCT Pub. No.: WO2013/124973
PCT Pub. Date: Aug. 29, 2013

(65) Prior Publication Data
US 2015/0054830 A1    Feb. 26, 2015

(51) Int. Cl.
*G06T 11/20* (2006.01)
*H02J 13/00* (2006.01)

(52) U.S. Cl.
CPC ............ *H02J 13/00* (2013.01); *G06T 11/206* (2013.01); *H02J 13/001* (2013.01); *Y04S 10/40* (2013.01)

(58) Field of Classification Search
CPC ............................... G06T 11/206; H02J 13/00
(Continued)

(56) References Cited

U.S. PATENT DOCUMENTS 6,549,880 B1 * 4/2003 Willoughby .............. H02J 3/00
                                                                  700/22
2002/0032535 A1 * 3/2002 Alexander ............ G01R 21/133
                                                                  702/64
(Continued)

FOREIGN PATENT DOCUMENTS

JP         10-283589 A       10/1998
JP         11-206016 A        7/1999
(Continued)

OTHER PUBLICATIONS

English translation of Koura et al (JP 2011-061963 A). Retrieved on Dec. 8, 2017.*

(Continued)

*Primary Examiner* — Shivang Patel
(74) *Attorney, Agent, or Firm* — Crowell & Moring LLP

(57) ABSTRACT

A display device of electric power system information comprises a display unit including a display screen; and a screen display control unit for controlling the display unit. The display screen includes a display area that is divided into a plurality of display cells each of which has a mapping function for showing relative positional relations. The display unit includes an electric power system diagram display function unit for displaying an electric system diagram that embodies the state of an electric power system being a monitoring target, a mapping item display function unit for displaying mapping display items in the background of the electric power system diagram using the display cells, and a menu display function for displaying menus and icons, which are used for selecting the mapping display items, on the display screen, and for accepting selection operations to the menus and icons on the display cells on the display screen. The mapping display items represent information of state quantities regarding the state of the electric power system being the monitoring target, and the mapping display (Continued)

items are displayed per display cell with different colors in accordance with the corresponding values of state quantities.

14 Claims, 24 Drawing Sheets

(58) Field of Classification Search
USPC .......................................................... 345/440
See application file for complete search history.

(56) References Cited

U.S. PATENT DOCUMENTS

| | | | |
|---|---|---|---|
| 2009/0031249 A1* | 1/2009 | Castelli | ................ G06Q 10/063 715/810 |
| 2011/0175750 A1* | 7/2011 | Anderson | ............... G01D 4/004 340/870.16 |
| 2012/0158202 A1 | 6/2012 | Yano et al. | |

FOREIGN PATENT DOCUMENTS

| | | | |
|---|---|---|---|
| JP | 2000-270499 A | | 9/2000 |
| JP | 2000-287388 A | | 10/2000 |
| JP | 2004-108846 A | | 4/2004 |
| JP | 2009-89594 A | | 4/2009 |
| JP | 2011-61931 A | | 3/2011 |
| JP | 2011061963 A | * | 3/2011 |
| JP | 2012-5210 A | | 1/2012 |

OTHER PUBLICATIONS

International Search Report (PCT/ISA/210) dated May 22, 2012 with English translation (five pages).

\* cited by examiner

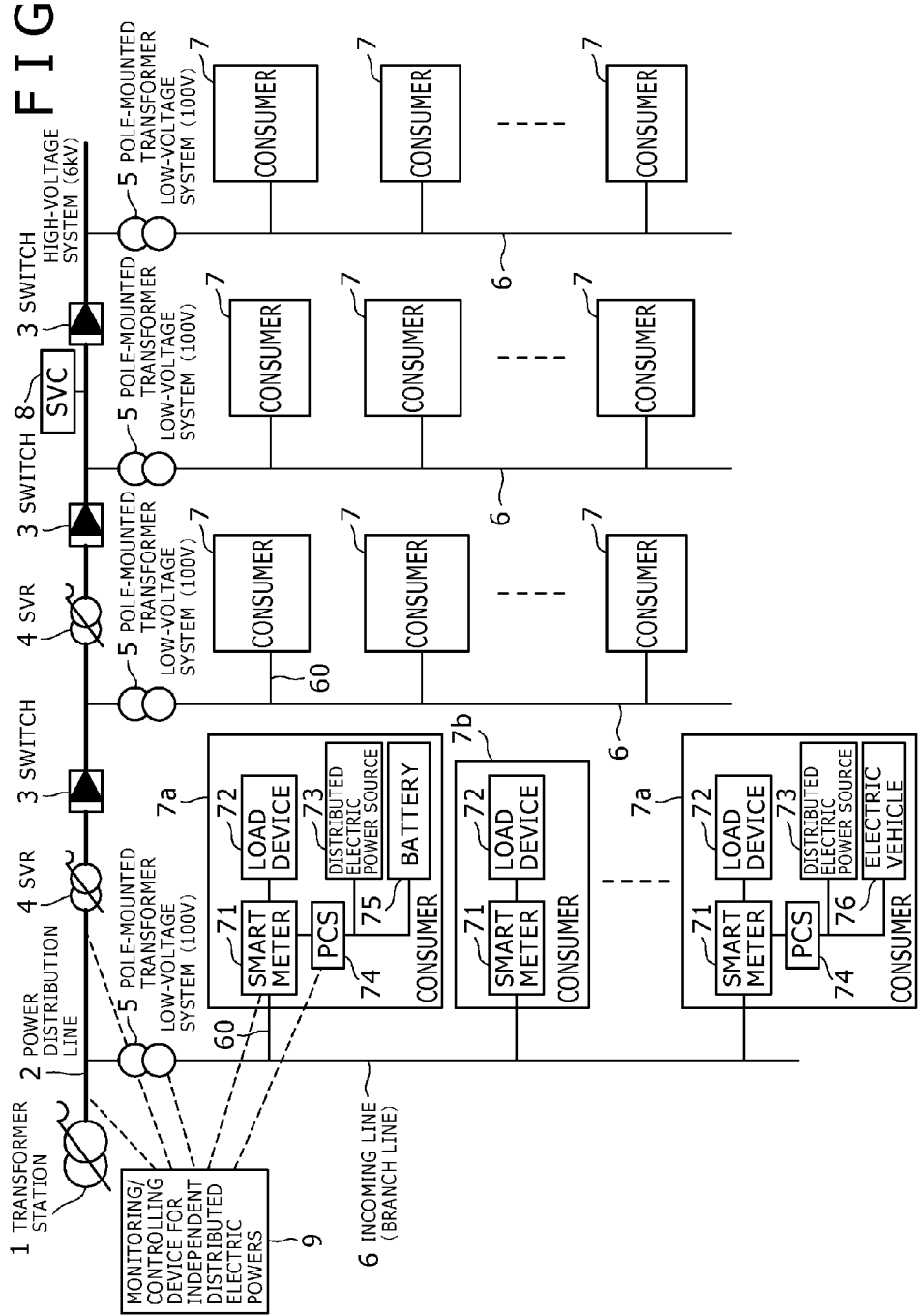

FIG.15

PROFILE TABLE OF CONSUMER LOAD CURRENT VALUE INFORMATION  156a

| MODULE ID (#N) |
| --- |
| MODULE TYPE ID |
| MODULE APPLICATION ID |
| TIME STAMP ID |
| IP ADDRESS |
| BRANCH LINE ID |
| MODULE GEOGRAPHIC COORDINATES |
| ... |

1561a OWNED MODULE ATTRIBUTE INFORMATION (ini FILE)

| ELECTRIC POWER SYSTEM ID |
| --- |
| CURRENT TIME |
| SYSTEM VOLTAGE |
| SYSTEM VOLTAGE TIME |
| ELECTRIC POWER METER·FORWARD POWER FLOW MEASUREMENT VALUE |
| ELECTRIC POWER METER·FORWARD POWER FLOW MEASUREMENT TIME |
| ELECTRIC POWER METER·BACKWARD POWER FLOW MEASUREMENT VALUE |
| ELECTRIC POWER METER·BACKWARD POWER FLOW MEASUREMENT TIME |
| ... |

1562a ELECTRIC POWER REAL SYSTEM INFORMATION

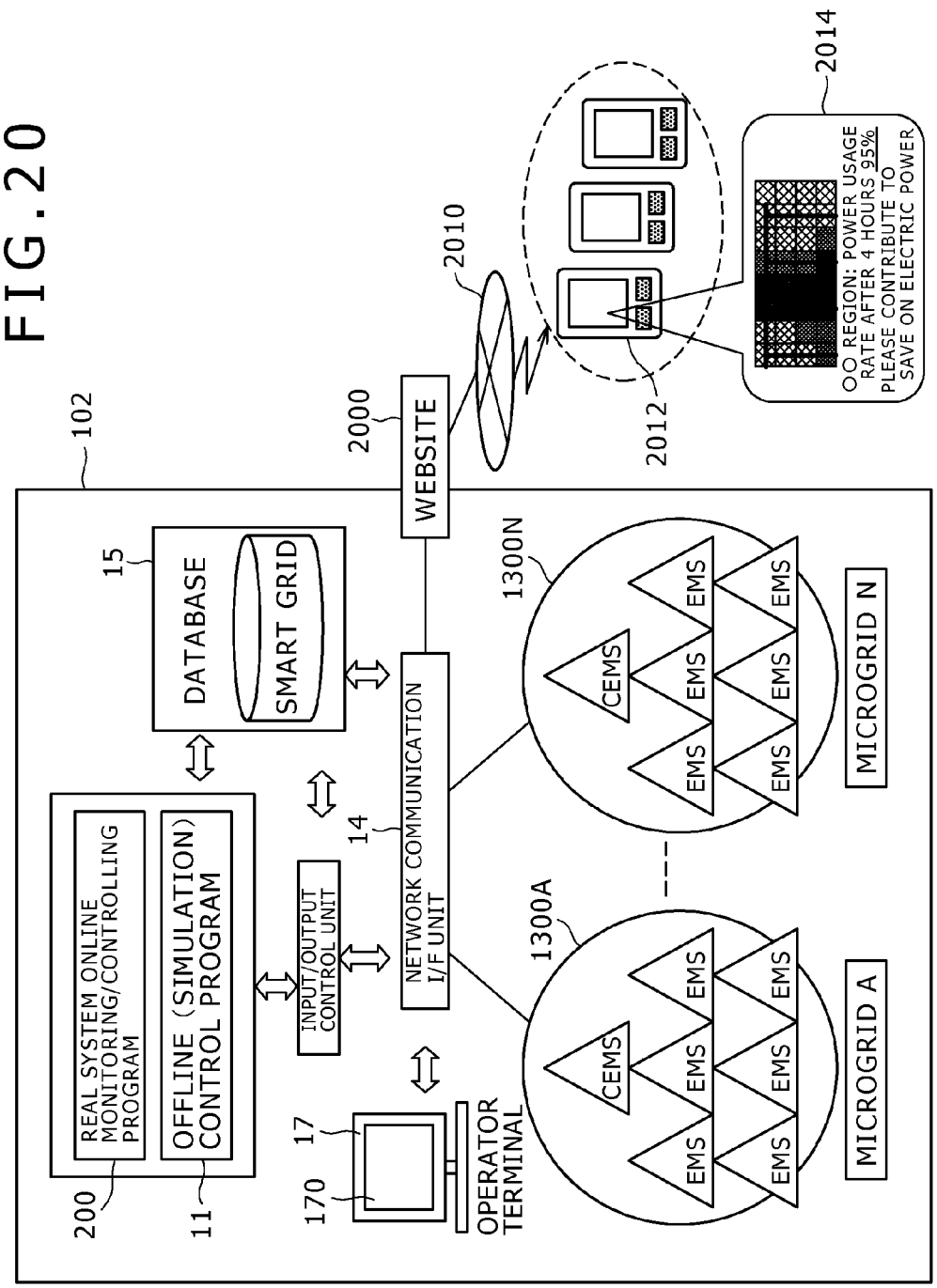

DISPLAY DEVICE AND DISPLAY METHOD OF ELECTRIC POWER SYSTEM INFORMATION

TECHNICAL FIELD

The present invention relates to display devices and display methods of electric power system information, and in particular, to a display device and a display method suitable for use in a simulation device for an electric power system including plural distributed electric power sources that utilize natural energies, and for use in an integral monitoring/controlling device, into which the simulation device is incorporated, for an electric power system.

BACKGROUND ART

There is a growing need for introducing power generating facilities that utilize natural energies, that is, distributed electric power sources to consumers of general households and business corporations. Surplus electric powers generated by such distributed electric power sources are fed into the electric power systems of electric power companies as backward power flows via power distribution lines. The electric powers of these backward power flows may be large disturbances for the electric power companies that have to manage the voltages of their electric power systems. Because electric powers generated by the distributed electric power sources are largely dependent on natural energies, the electric powers are susceptible to the influence of weather, so that it becomes difficult for the electric power companies to manage the voltages of their electric power systems. In addition, in recent years, a new usage configuration of batteries of electric vehicles and the like, in which electric powers are charged up at night and are used during periods when the electric powers are needed, has become widely spread. These batteries can be regarded as parts of the distributed electric power sources.

In order to easily manage the electric power systems, a method in which information about electric power systems are three-dimensionally displayed on the screen of a display device is disclosed in Patent Literature 1. According to this method, the magnitude of voltage of each node or the magnitude of deviation from the node voltage reference value of each node is displayed as the height of a cylindrical column that corresponds to the magnitude, and this cylindrical column is disposed in the upward direction or in the downward direction from the node in the three-dimensional space of the electric power system. The tendency of change of the voltage of each node or the tendency of change of the deviation from the node voltage reference value of each node is displayed by changing the diameters of the upper and lower surfaces of the cylindrical column. In addition, the active and reactive power flows of branches, the capacities of facilities, and the like are also three-dimensionally displayed using solids. Further, when two arbitrary nodes are selected, the sinusoidal waveform with a voltage phase angle is displayed.

On the other hand, Patent Literature 2 disclosed an integral monitoring/controlling system in which the generated power output of each distributed electric power source and the loads of consumer facilities in a smart grid or in a microgrid is monitored and controlled. This system is equipped with an emergency accommodating procedure-creating means for creating accommodating procedures according to which the total sum of generated power outputs of individual distributed electric power sources is matched with the total sum of loads of individual consumer facilities using information obtained by a measurement value-monitoring means and information managed by a consumer information management means in the case where a failure occurs in the corresponding microgrid system or smart grid system.

In addition, Patent Literature 3 discloses a power-distribution-system power-flow simulation device in which individual power consumption values and backward power flows of a lot of consumers can be taken into consideration. According to the device disclosed by Patent Literature 3, plural consumer-load simulation units and distributed electric power source simulation units are provided, and the variations of load powers and the variations of generated powers of the distributed electric power sources such as photovoltaic generation powers at plural consumers such as general households are individually simulated, which makes it possible to calculate the power flows of power distribution systems that are nearer to practical power distribution systems by taking the simulation result into consideration.

CITATION LIST

Patent Literature

Patent Literature 1: Japanese Unexamined Patent Application Publication No. 2000-270499
Patent Literature 1: Japanese Unexamined Patent Application Publication No. 2011-61931
Patent Literature 3: Japanese Unexamined Patent Application Publication No. 2012-5210

SUMMARY OF INVENTION

Technical Problem

In order to make the management of electric power consumption easier in an environment marked by a large number of distributed electric power sources installed in an electric power system, the performance and information function of power distribution equipment have been strengthened. In related electric power systems, because it is not always necessary to take the influences of distributed electric power sources into consideration, centralized controls have been mainly adopted. However, because various kinds of natural energies will be introduced to an electric power system, and it is necessary to consider that the relevant disasters will happen from now on, it is expected to be more advantageous for the stability of the electric power system and the reduction of the total cost of control devices that the authority to control these natural energies is distributedly disposed, therefore independent distributed control algorithms have been widely studied.

In the case where such an electric power system is analyzed using a simulator, many output signals are calculated on the basis of a large number of condition configurations. In order for an operator to advantageously use these many input/output relations, the function to display these many input/output relations with high visibility becomes very important. For example, because a simulation whose target is an electric power system including many distributed electric power sources such as a smart-grid simulation has complicated input/output relations, a technology that visualizes the input/result relations with high visibility is earnestly requested in order for an operator to easily understand the result of the simulation.

In particular, in the control of the independent distributed electric power system, if a simulator is used for the development and evaluation of the control algorithm, a visualization technology, which makes it easier to quickly and precisely understand the operation content, cause/result relations, and the like, is thought of as an important technology. For example, it is desirable that, if a backward power flow occurs in an electric power system, not only the occurrence of the backward power flow but also signal changes including the cause for the occurrence of the backward power flow in the electric power system are displayed on a display device so that they can be grasped at first sight.

Although an invention disclosed in Patent Literature 1 is suitable for a centralized control, sufficient consideration is not paid for the visualization of an electric power system including many distributed electric power sources.

Although consideration is paid for distributed electric power sources in inventions disclosed Patent Literatures 2 and 3, sufficient consideration is not paid for the visualization of input/result relations with high visibility.

One of the objects of the present invention is to provide a display device and a display method of electric power system information that can display signal changes in an electric power system including distributed electric power sources and the causes for the signal changes as well with high visibility.

Solution to Problem

A typical example of the present invention is as follows. A display device of electric power system information comprises a display unit including a display screen; and a screen display control unit for controlling the display unit. The display screen includes a display area that is divided into a plurality of display cells each of which has a mapping function for showing relative positional relations. The display unit includes an electric power system diagram display function unit for displaying an electric system diagram that embodies the state of an electric power system that is a monitoring target, a mapping item display function unit for displaying mapping display items in the background of the electric power system diagram using the display cells, and a menu display function for displaying menus and icons, which are used for selecting the mapping display items, on the display screen, and for accepting selection operations to the menus and icons on the display cells on the display screen. The electric power system, which is the monitoring target, includes distributed electric power sources, and the mapping display items represent information of state quantities regarding the state of the electric power system that is the monitoring target, and the mapping display items are displayed per display cell with different colors in accordance with the corresponding values of state quantities.

Advantageous Effects of Invention

According to the present invention, using plural display cells each of which has a mapping function for showing relative positional relations, not only the state of an electric power system including distributed electric power sources but also state quantities, which are causes for the variation of the state of the electric power system, are mappingly displayed by different colors, with the result that the signal changes of the electric power system can be displayed with high visibility.

BRIEF DESCRIPTION OF DRAWINGS

FIG. 2 is a diagram showing an example of the configuration of an electric power system to which the electric power system simulation device according to the first embodiment is applied.

FIG. 15 is a diagram showing a configuration example of a profile table according to the second embodiment.

FIG. 20 is a diagram showing examples of the functional blocks of a control unit of an electric power system control device according to a third embodiment, a display method executed on a display unit, and an example of the usage configuration of the display method.

DESCRIPTION OF EMBODIMENTS

Hereinafter, some embodiments of the present invention will be described with reference to the accompanying drawings. In the following descriptions of the present invention, although a term "cell" will be used as is the case for a display cell or a control cell, the term "cell" can be replaced with a grid or other words. However, because there is a possibility that the term "grid" is mixed up with a term "smart grid" that is used in the same electric power field, the term "cell" will be used in the following descriptions of the present invention.

First Embodiment

Figure 1:
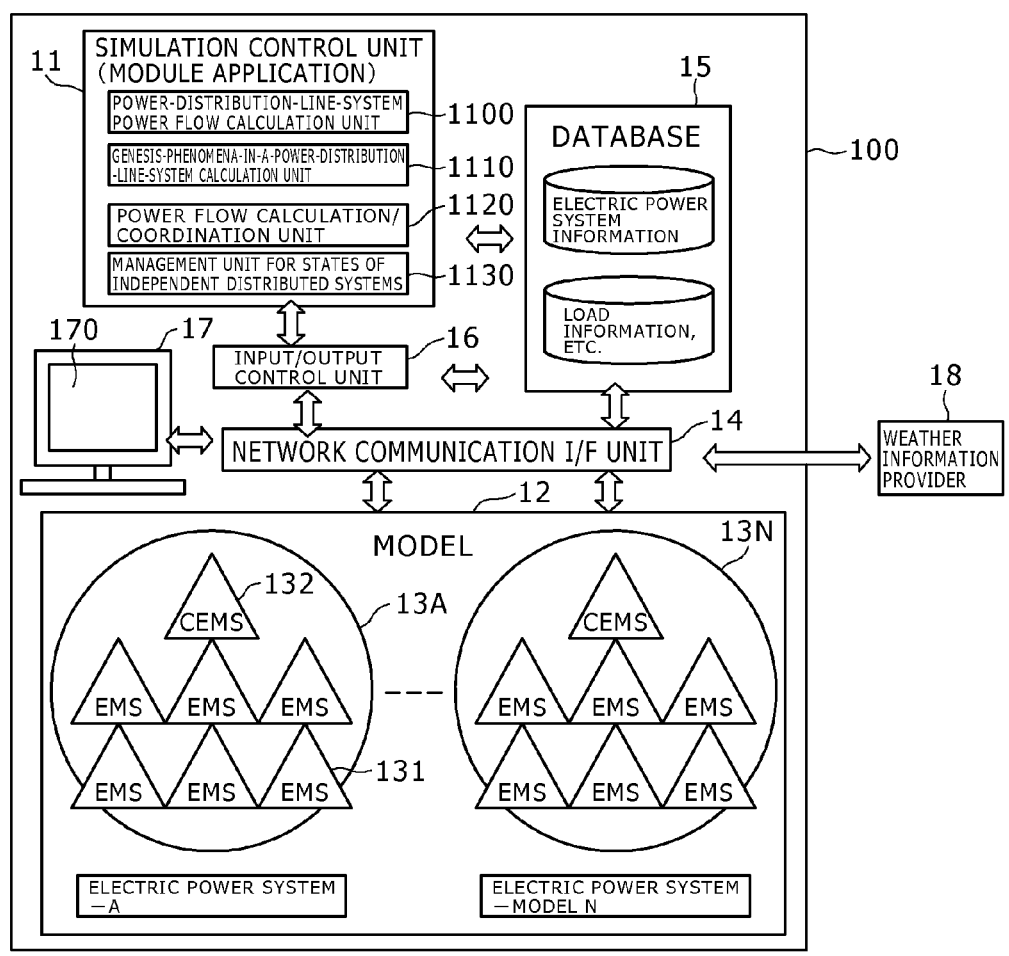
FIG. 1 is a diagram showing a configuration example of the entirety of an electric power system simulation device according to a first embodiment of the present invention.

A display device of electric power system information according to a first embodiment of the present invention will be described with reference to FIG. 1 to FIG. 12D. FIG. 1 is a diagram showing a configuration example of the entirety of an electric power system simulation device, which includes a display device of electric power system information, according to the first embodiment of the present invention. The electric power system simulation device 100 includes a simulation control unit 11; a simulation model 12 including the models of electric power systems 13A to 13N; a network communication unit 14; a database 15; an input/output control unit 16; and an operator terminal 17 including a display screen 170. The electric power system simulation device 100 can communicate with a weather information provider terminal 18 via the network communication unit 14. Each of the models of electric power systems 13A to 13N is configured to correspond to plural energy management systems (EMSs) 131 and a community energy management system (CEMS) 132 that integrates these EMSs. The power system simulation device 100 includes plural power-distribution-system simulation devices (Refer to FIG. 3A).

The simulation control unit 11 comprised of a computer includes programs that realize the functions of a power-distribution-system power flow calculation unit 1100; a genesis-phenomena-in-a-power-distribution-system calculation unit 1110; a power flow calculation/coordination unit 1120; a management unit for states of independent distributed systems 1130; the network communication unit 14; and the like, as module applications for realizing individual power-distribution-system simulation devices.

FIG. 2 is a diagram showing an example of the configuration of a "power distribution system" of a real electric power system (real system) to which the electric power system simulation device is applied. In this embodiment, it will be assumed that the power distribution system indicates an interval from a terminal transformer station 1 to a consumer 7 (any of consumers 7a to 7n). In addition, electric power companies and the like refer to an interval from the terminal transformer station 1 to each pole-mounted transformer 5 as a power distribution line 2, and refer to an interval from the pole-mounted transformers 5 to the consumer 7 such as a general household as an incoming line 6 (or a branch line). Further, generally speaking, the value of voltage on the power distribution line 2 is configured to be 6.0 kV or 6.6 kV (high-voltage system), and the values of voltages on the incoming lines 6 are configured to be 100 V or 200 V (low-voltage system).

As shown in FIG. 2, switches 3 used for safety measures and failure avoidance measures, step voltage regulators (SVRs) 4 used for voltage adjustment, and static var compensators (SVCs) used for adjusting voltages using reactive power (Q) control are appropriately installed on the power distribution line 2. In addition, the pole-mounted transformers 5 are installed in the plural positions which branch off from the power distribution line 2, and the plural consumers 7a to 7n are coupled to the incoming lines 6 pulled out from these pole-mounted transformers. Here, the consumer 7a includes an electric measuring vessel (smart meter) 71, a load device 72, a distributed electric power source 73, a power conditioning system (PCS) 74, and a battery 75. Although the consumer 7b includes a smart meter 71, a load device 72, it does not includes a distributed electric power source 73, nor a PCS. Further, the consumer 7n includes a smart meter 71, a load device 72, a distributed electric power source 73, a PCS 74, and an electric vehicle 76. The distributed electric power source 73 represents a photovoltaic power generator, a wind power generator, or the like. The smart meters 71 are used for electric power companies to collect information about electric power values (voltage values, current values) and power consumptions spent by the consumers 7.

Here, the high-voltage system of a transmission system is comprised of plural branched systems, and a monitoring/controlling device for independent distributed electric powers (management server) 9 is installed per "distribution system", and these monitoring/controlling devices for independent distributed electric powers 9 execute independent, accommodative, and centralized control to optimize the entirety of the transmission system in cooperation with an upper management server. In addition, it is not always necessary to install one monitoring/controlling device for independent distributed electric powers 9 per "power distribution system", but it is all right if an appropriate number of the monitoring/controlling device for independent distributed electric powers 9 are installed in accordance with the actual situation. For example, in the case where there are regions on which "distributed control" should be executed and regions on which "centralized control" should be executed in a mixed state depending on the installation situation of distributed electric power sources, monitoring/controlling devices for independent distributed electric powers 9 may be installed only in the former areas. The smart meter 71 has an AMI (advanced metering infrastructure) function, and has not only a function to measure the powers of forward power flow or backward power flow, but also a function for communicating with a monitoring/controlling device for independent distributed electric powers 9 that manages the state of the power distribution line 2, and the like. Further, the electric power meter may have a so-called demand side management (DSM) function.

If the standard voltage of the incoming line 6 is 100 V, the voltage of the incoming line 6 is adjusted within 101±6 volts, and if the standard voltage of the incoming line 6 is 200 V, the voltage of the incoming line 6 is adjusted within 202±20 volts.

Figure 3A:
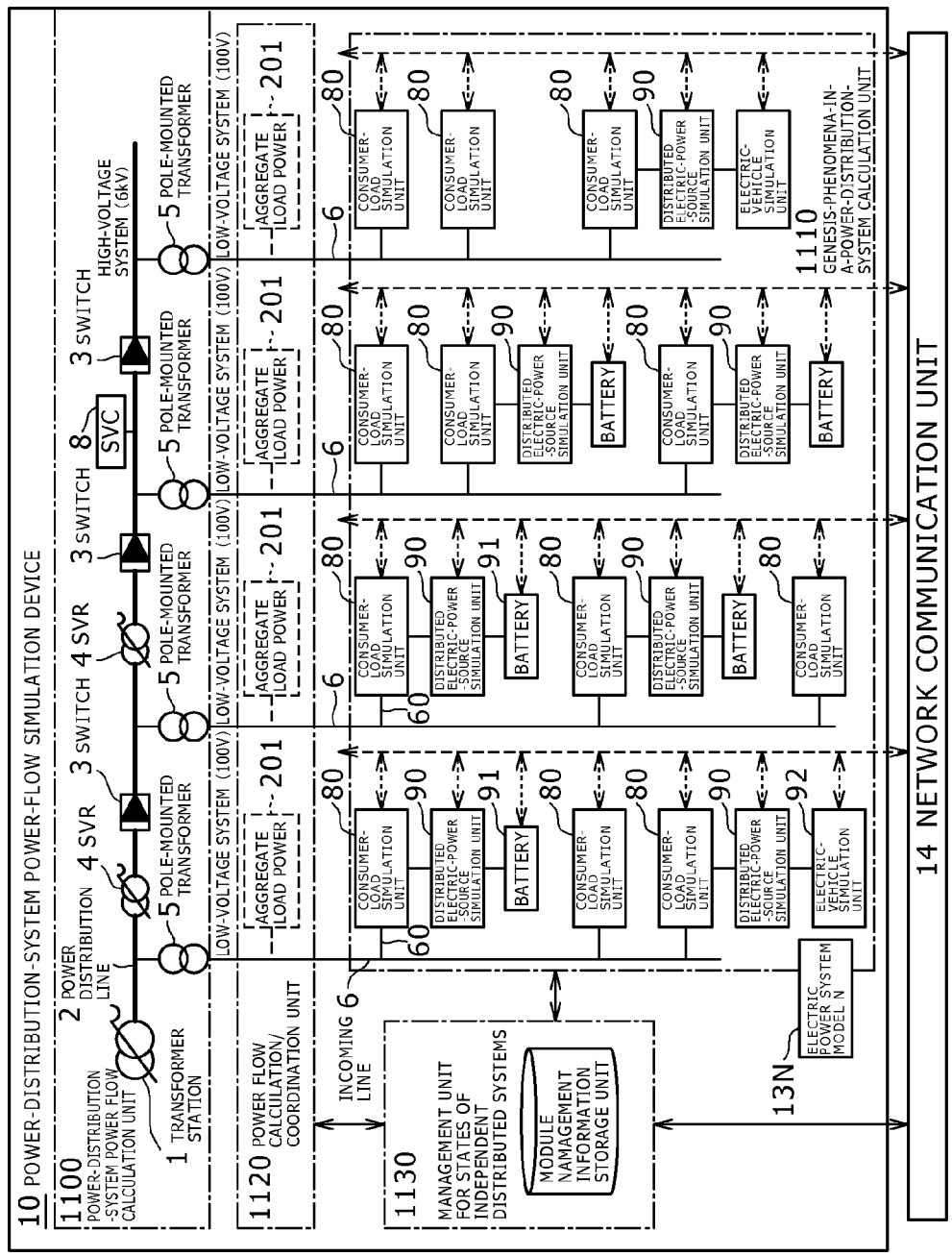
FIG. 3A is a diagram showing the configuration of the functional blocks of a simulation model unit of the electric power system simulation device according to the first embodiment.

FIG. 3A is a diagram showing the configuration of the functional blocks of a simulation model unit of the electric power system simulation device 100. The power-distribution-system simulation device 10 of the simulation model unit includes functional blocks such as the power-distribution-system power flow calculation unit 1100, the genesis-phenomena-in-a-power-distribution-system calculation unit 1110, the power flow calculation/coordination unit 1120, the management unit for states of independent distributed systems 1130, a consumer-load simulation unit 80, a distributed electric-power-source simulation unit 90, an electric-vehicle simulation unit 92. In FIG. 3A, in order to clearly express which part of the power distribution system, which is a simulation target, is simulated by each function block, a part of the configuration of the power distribution system shown in FIG. 2 is depicted together. The function blocks, such as the power-distribution-system power flow calculation unit 1100, the genesis-phenomena-in-a-power-distribution-system calculation unit 1110, the power flow calculation/coordination unit 1120, the management unit for states of independent distributed systems 1130, the network communication unit 14, the consumer-load simulation unit 80, the distributed electric-power-source simulation unit 90, and the electric-vehicle simulation unit 92, are realized by a CPU's executing programs that correspond to individual functional blocks and that are stored in a storage device.

Next, the functions of the functional blocks included by the power-distribution-system simulation device 10 will be described with reference to FIG. 3A. Here, it will be assumed that Patent Literature 3 can be referred to for the concrete configuration and behavior of the power-distribution-system simulation device 10, and only the characteristic points of the present invention will be mainly described in the following description.

The power-distribution-system power flow calculation unit 1100 is a functional block for simulating the power flow of a part of the power distribution system from a terminal transformer station 1 to a pole-mounted transformer 5, that is, the so-called power distribution line 2. In other words, the power-distribution-system power flow calculation unit 10 calculates voltage values at individual points on the power distribution line 2 (including positions at the secondary side of the pole-mounted transformer 5) when a load power regarding the pole-mounted transformer 5 is input. SVRs and SVCs are installed in the high-voltage system (6 kV) of the power-distribution-system power flow calculation unit 1100, and the SVRs and SVCs together execute voltage control in a coordinated manner. In the case where a lot of consumers are coupled to a low-voltage power distribution line, individual consumers cannot be distinguished by the high-voltage side, and the consumers are viewed as a group of consumers from the high-voltage side. The power-distribution-system simulation device is used for developing and evaluating these control algorithms. In addition, the power-distribution-system simulation device 10 includes the management unit for states of independent distributed systems 1130 that functions as the simulation unit of the monitoring/controlling device for independent distributed electric powers in order to execute independent, distributed control. In order to evaluate an independent distributed type, after such a system configuration as above is supposed, the state of the system is simulated on the basis of a new control algorithm. Generally speaking, voltage control devices, which are referred to as SVRs and SVCs, are installed on the high-voltage side of the power distribution system (6 kV). A method in which SVRs and SVCs together execute voltage control in a coordinated manner is proposed. The power-distribution-system simulation device develops and evaluates the control algorithm. Further, in the case where there are regions on which "distributed control" should be executed and regions on which "centralized control" should be executed in a mixed state, it is natural that there are both "distributed" and "centralized" control methods in a mixed state.

The consumer-load simulation unit 80 simulates the time-variation of power consumption per day spent by the consumer 7. When a certain time of day is input, the meter value (electric energy) of the smart meter 71 at the certain time of day is output on the basis of the result of the simulation.

A concrete method in which the simulation is realized in the consumer-load simulation unit 80 is, for example, a method in which, after the family structure of the consumer 7, the usage schedule of lighting fixtures and electric home appliances depending on the daily rhythm of the consumer, and the like are tabulated to make a database, the time-variation of the power consumption is simulated on the basis of the usage schedule.

The distributed electric-power-source simulation unit 90 simulates the time-variation of electric power generated by a distributed electric power source 73 such as a photovoltaic power generation (PV) or a wind power generator that is possessed by the consumer 7 per day. When a certain time of day is input, the meter value of the smart meter 71 at that time of day is output on the basis of the result of the simulation. At this time, the value of the meter represents the electric energy of backward power flow.

The management unit for states of independent distributed systems 1130 aggregates the meter values of the smart meters 71 read out from individual consumer-load simulation units 80 and individual distributed electric-power-source simulation units 90 per incoming lines 6 to which the smart meters are coupled, and calculates a load power per pole-mounted transformer 5 (aggregate load power 201) to which each incoming line 6 is coupled. Subsequently, the management unit for states of independent distributed systems 1130 inputs each aggregate load power 201 to the power-distribution-system power flow calculation unit 1100 via the power flow calculation/coordination unit 1120, and requests the power-distribution-system power flow calculation unit 1100 to perform a power flow simulation.

In addition, the management unit for states of independent distributed systems 1130 obtains the voltage value at the position of each pole-mounted transformer 5, that is, the voltage value of each incoming line 6, and sends the obtained voltage value of each incoming line 6 to the corresponding consumer-load simulation unit 80 and distributed electric-power-source simulation units 90 via the network communication units 14.

As described above, the management unit for states of independent distributed systems 1130 obtains detail information per pole-mounted transformer or per power distribution system interval, which makes it possible to appropriately manage the voltages of the power distribution network. Data of each consumer is sent to the management unit for states of independent distributed systems 1130. The management unit for states of independent distributed systems 1130 aggregates plural pieces of information per pole-mounted transformer or per power distribution system interval, and controls the SVCs and SVRs. The SVCs are in charge of short-time voltage variations, and the SVRs are in charge of voltage control over variations with long cycles or load variations with one-day cycles. Owing to the functions of the SVCs and SVRs, it becomes possible to estimate the load quantity of each power distribution system interval, and more appropriate operation of the power distribution system can be achieved. In particular, it becomes possible to manage the voltages of the power distribution network in a more detailed way.

In addition, the genesis-phenomena-in-a-power-distribution-system calculation unit 1110 obtains data regarding causes for the variations of the states of the electric power systems of the power distribution system intervals in conjunction with simulations of load powers and generated powers, or calculates data to be obtained on the basis of some kind of algorithm, and outputs the data.

As described above, in the power-distribution-system simulation device 10 according to this embodiment, the simulation of the power flows of the power distribution system can be performed so that the consumer-load simulation units 80 and the distributed electric-power-source simulation units 90, which are capable of simulating load powers and generated powers both of which change in various forms, may adapt to the dispositions of real power distribution lines 2, pole-mounted transformers 5, and incoming lines 6. Therefore, the simulation of the power flows of the power distribution system can be performed in a form that more faithfully meets the actual situation.

In addition, as for the usage configuration of the smart meter 71 in the future, it is conceivable that the smart meter 71 will be made into a multifunctional electric energy meter that includes the function of two-way communication and capability of high information processing, and further, it is conceivable that each consumer 7 will install measurement devices for measuring temperature and the amount of sunlight, with the result that it will become possible for an electric power company to collect information about the state of a load device and an environment such as temperature of each consumer 7, and information about the states of a distributed electric power source, battery, and battery of an electric vehicle of each consumer as well via this smart meter. Because the electric power company can obtain more detailed information about weather and energies and information provided from the weather information provider terminal 18, the electric power company can leverage these pieces of information in the improvement of energy demand- and supply balance and the estimation of demand by performing simulation using of these pieces of information. Further, if an emergent situation such as an electric power shortage is anticipated as a result of the simulation, the electric power company can control the load device and distributed electric power source of each consumer 7 within predefined limits via the smart meter in order to secure the stability of electric power sources in the corresponding region. On the other hand, it is conceivable that each consumer is provided with not only information about his/her own energy, but also with information about energies of his/her neighboring regions from the electric power company, and the effective utilization of energies can be achieved as a result.

Next, a concrete method for realizing the power-distribution-system simulation device 10 using a computer will be described.

Figure 3B:
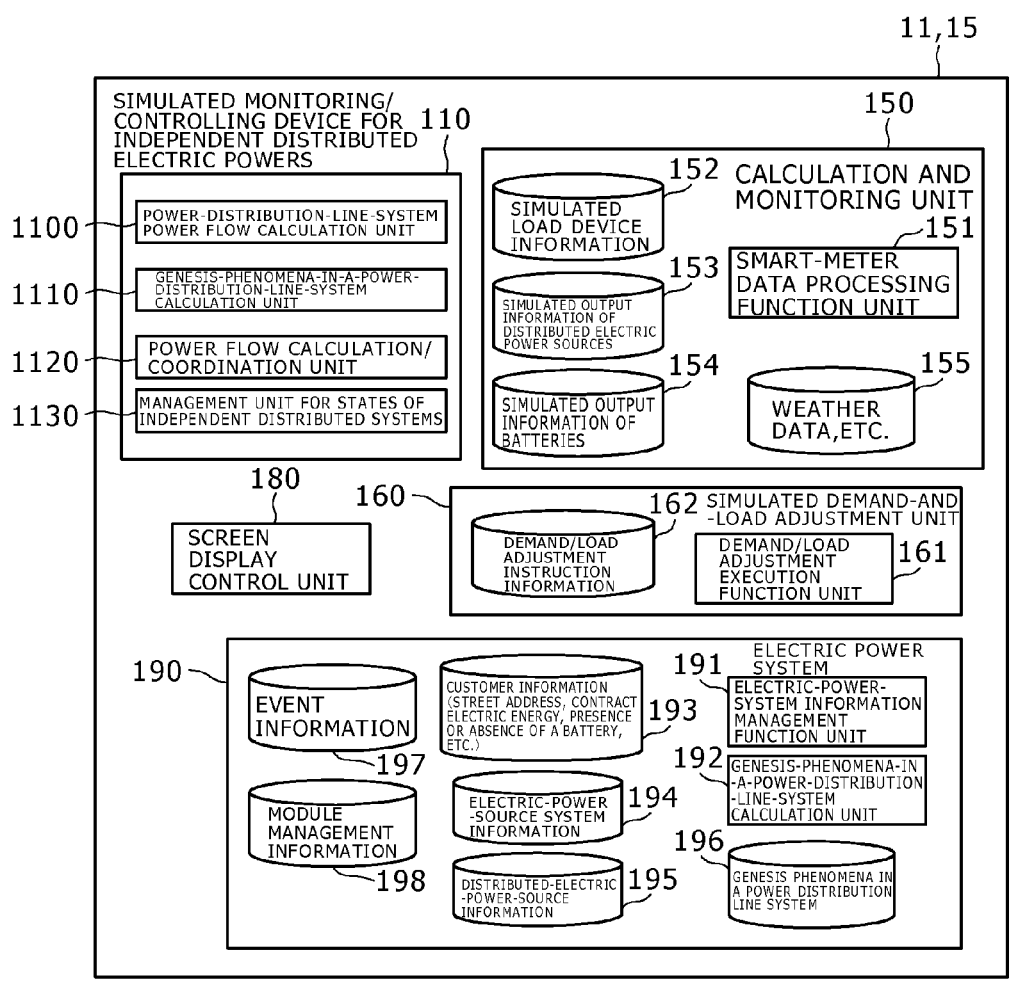
FIG. 3B is a diagram showing examples of the functional blocks of a control unit of the electric power system simulation device according to the first embodiment.

FIG. 3B is a diagram showing examples of the functional blocks of a control unit of the electric power system simulation device. The control unit 11 of the power-distribution-system simulation device 10 includes a simulated monitoring/controlling device for independent distributed electric powers 110, a measurement and monitoring unit 150, a simulated demand-and-load adjustment unit 160, a screen display control unit 180, and an electric power system management unit 190. This control unit 11 can be realized by a computer equipped with a storage device including a CPU, a RAM, a hard disk device, and the like. The measurement and monitoring unit 150 includes a smart-meter data processing function unit 151, and further includes simulated load device information 152, simulated output information of distributed electric power sources 153, simulated output information of batteries 154, weather data 155 and the like as a database. The simulated demand-and-load adjustment unit 160 includes a demand-and-load adjustment execution function unit, and further includes demand-and-load adjustment command information 162 as a database. The electric power system management unit 190 includes an electric-power-system information management function unit 191, genesis-phenomena-in-a-power-distribution-line-system calculation unit 192, and further includes customer information (street address, contract electric power energy, presence or absence of a battery, etc.) 193, electric-power-source system information 194, distributed-electric-power-source information 195, genesis phenomena in a power distribution line system 196, event information 197, module management information 198. The management unit for states of independent distributed systems 1130 enables the calculation of the coordination available capacity of distributed electric power sources, and the calculation of voltage distributions, short-circuit capacities, and the like at the time of distributed electric power source coordination using power flow calculation. In addition, data of electric poles, high-voltage lines, switches, voltage regulators, and the like are automatically brought in by coordinating the measurement data of a power distribution automation system, which makes it possible to execute an analysis on a basis of the actual situation.

Next, the display screen 170 of the operator terminal 17 will be described. The display screen 170 includes a GUI function, and acts as an input/output means for the operator terminal 17 as is the case with a mouse, a keyboard, a printer, and the like. The display screen 170 is a screen that employs liquid crystal technology or organic electroluminescence (EL) technology, and is designed to correspond with an electrostatic touch panel.

Figure 4:
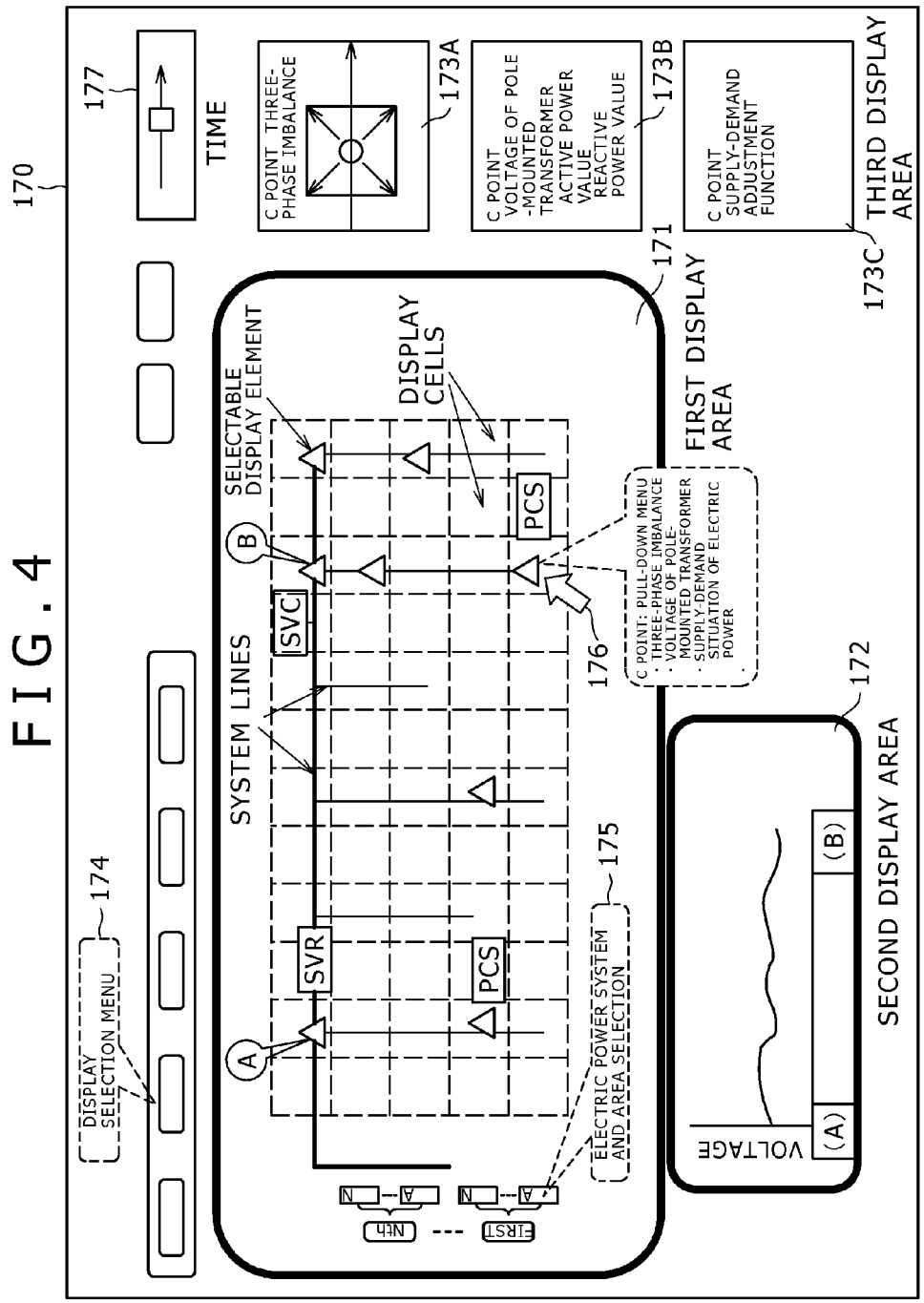
FIG. 4 is a diagram showing a configuration example of the display elements of a display unit of the electric power system information according to the first embodiment.

FIG. 4 is a diagram showing a configuration example of the display screen 170, which is a display unit of the electric power system information, according to the first embodiment. The display screen 170 includes a first display area 171 in the center of the screen, a second display area 172 below the first display area, and a third display area 173 (173A to 173C) to the left of the first screen. In addition, there are a display selection menu 174 to the upper left of the first display area, an electric power system and area selection menu 175 in the right side of the first display area, and displayable selection elements 176 at plural positions in the first display area. In addition, there is a column 177 that displays a simulation time to the upper right of the first display area. An energy system diagram, which is a monitoring target, is embodied in the first display area 171, and plural spots are selectably displayed in the screen display area on the energy system diagram. The energy system corresponds to, for example, a power system or a power distribution system each of which is a monitoring target. At least one energy distribution between two spots, which are two selected spots on the energy system in the first display area 171 (in this example, between point A and point B), is displayed in the second display area 172. Further, in this example, three-phase imbalance (173A), voltage of pole-mounted transformer (173B), and supply-demand adjustment function (173C) regarding point C, which are selected from a pull-down menu of selection elements 176 at point C on the energy system, are displayed in the third display area 173. The voltage three-phase imbalance, which is shown in the third display area as reference information, is three-dimensionally displayed in order to improve its viewability because there are the restriction of the screen area and the like. The above-described layout shown in the first display area to the third display area on the display screen 170 is only one example, and although many other layouts may be made without being limited to the above-described layout, it is necessary that the first display area should have the largest display area of the three display areas.

In addition, in the first display area 171, the energy states around the plural spots are coloredly displayed in the background of the energy system diagram using plural cells. The plural cells also have a function for displaying the relative positional relations between the energy system and the consumers and the like. The display selection menu 174 coloredly displays state quantities corresponding to the positions of monitoring targets in the background of the energy system, which is a monitoring target, as mapping display items in such a way that the state quantities are superimposed onto the energy system diagram using the display cells that display the relative positional relations of the monitoring targets. The mapping display items that can be selected are state quantities such as a voltage distribution, a temperature distribution, a solar radiation amount distribution, a distribution of distributed electric power sources and battery powers, power consumption distribution. As for these state quantities, not only the current values of these state quantities, but also the predicted values in the future and the actual values in the past can be displayed in a mapping mode.

In addition, the displays of the SVRs, SVCs, PCSs, and the like, which are displayed in the first display area 171, can be used as icons for operation inputs. Therefore, by using these icons on the display of the first display area 171, an operator can change control parameters and the like, and also can control the voltage values of the power distribution lines 2 and the incoming lines 6 so as to fall respectively within their controlled tolerances all over the energy system by inputting necessary data.

Figure 5:
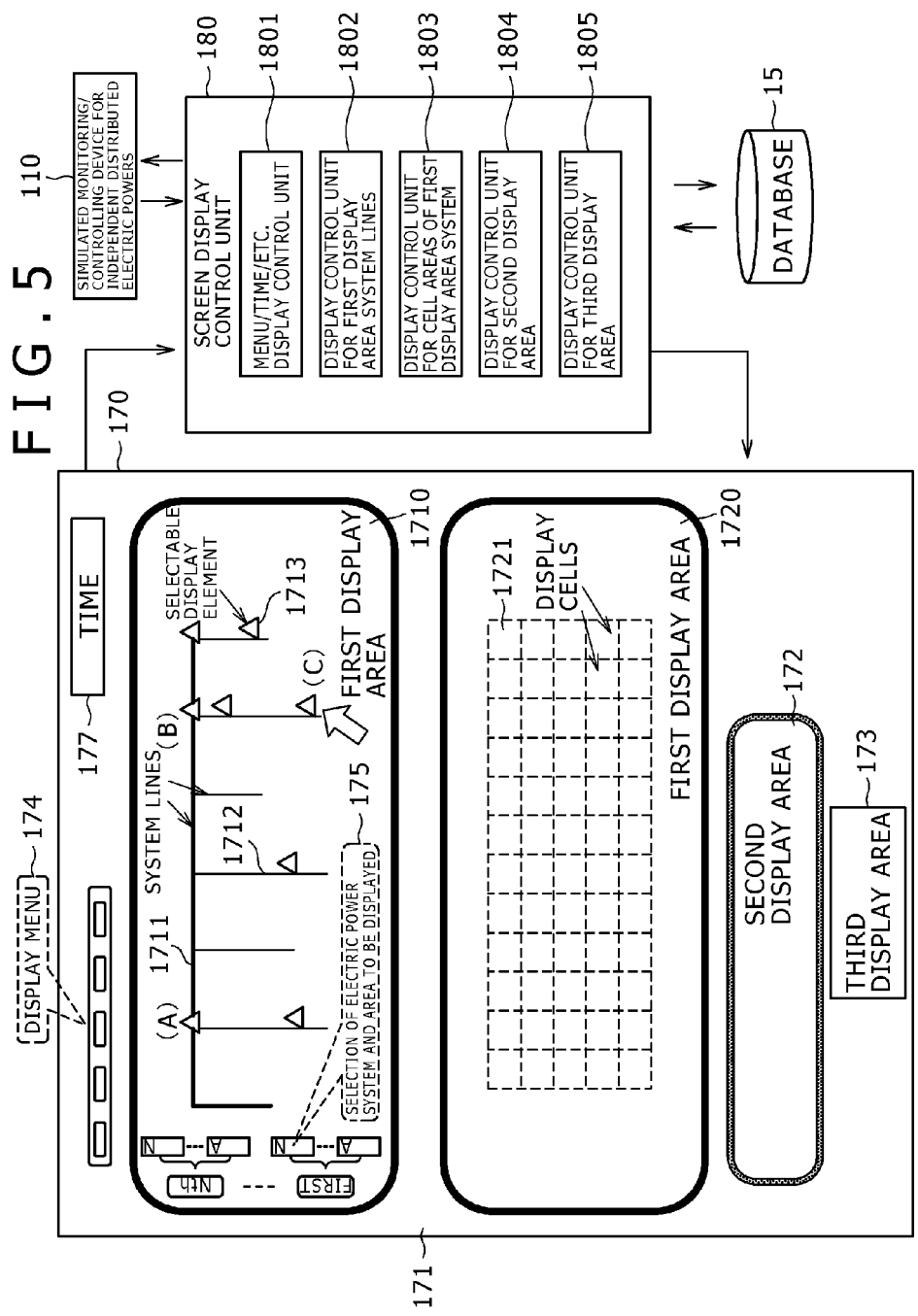
FIG. 5 is a diagram showing the display unit shown in FIG. 4 and a configuration example of a screen display control unit for controlling the display unit.

FIG. 5 is a diagram showing the display unit 170 shown in FIG. 4 and a configuration example of the screen display control unit 180 for controlling the display unit 170. The display unit 170 includes an energy system diagram display function unit 1710 and a mapping item display function unit 1720. The energy system diagram display function unit 1710 is a unit for displaying mainly the states of system lines that are monitoring targets, and displays at least a system line 1711, a system line 1712, and a display element 1713. The mapping item display function unit 1720 displays information of state quantities regarding the states of the system lines on individual cell areas 1721, where the individual cell areas 1721 are obtained by breaking the energy system, which is a monitoring target, that is, an electric power system and area, into net-like parts the aggregation of which is equivalent to a map that shows the positional relations of the cells on a plane surface.

The screen display control unit 180 includes a menu/time/etc. display control unit 1801, a display control unit for first display area system lines 1802, display control for cell areas of first display area system 1803, a display control unit for second display area 1804, and a display control unit for third display area 1805. The screen display control unit 180 outputs and displays necessary information on the pre-defined positions of the display unit 170 at predefined timings on the basis of menus, commands and data that are input through operations to the display selection menu 174, the electric power system and area selection menu 175 in the right side of the first display area, or through operations to a mouse and a keyboard, and on the basis of calculation results regarding monitoring targets provided by the simulated monitoring/controlling device for independent distributed electric powers 110 and values provided by the database 15.

In order to display cells in the cell areas 1721 of the first display area of the display unit 170, the screen display control unit 180 carries out calculations in consideration of the geographical or relative positional relations of individual cells, the states of consumers, weather conditions, etc. and further the influences from plural spots into consideration, and the screen display control unit 180 displays the calculation results for the cells respectively. In this case, the conspicuous displays of the cells can be given to an observer by providing the cells with areas larger than the display areas of the lines, and the conspicuous displays of the cells are suitable for the overall trend of the electric powers of the power distribution system and its neighborhood to be shown using plural cells Alternatively, the conspicuous displays are suitable to invite the observer's some kind of attention.

In the first display area 171, the energy system lines 1711 and 1712, regarding each of which at least one of the voltage, current, and phase of the electric power system can be selected, and the display elements 1713, using each of which the display content of the phenomenon existing in this electric power system can be selected, are displayed on the individual cell areas 1721 that are segmented net-like parts on a plane equivalent to a map showing the positional relations of the cells. In this case, the energy system lines 1711 and 1712, and the display elements 1713 are superimposedly displayed onto the energy state of the electric power system and the like in the first display area 171. In other words, if one of the voltage, current, phase, solar radiation, and the like regarding each of the electric power systems 1711 and 1712 is selected using the display element 1713, information about the state quantity, for example, information about an energy state, is superimposedly displayed onto the electric power system on the plane equivalent to the map.

The state quantity is displayed per cell with a different "color display", for example, with a different color in accordance with whether the value of the state quantity is strong or weak, or high or low. In other words, the state quantity is displayed by changing at least one attribute of hue, chromaticness, and brightness of the state quantity in accordance with the value of the state quantity color. For example, as generally employed in other fields, if a strong or high state quantity such as a high voltage is displayed by a warm color, and a weak or low state quantity such as a low voltage is displayed by a cool color, an operator can easily detect the changes of the state qualities of individual display cells. In other words, because the state quantity of each display cell is displayed with a different color in accordance with whether the level of the state quantity of each display cell is strong or weak, or high or low, the signal change of an electric power system, which is a monitoring/controlling target, can be displayed on the display unit 170 with high visibility. In addition, as for a method of "color display", types and gradations (or gray gradations) of color, different patterns, sizes of display area and display width, the presence or absence of periodical changes of color, and the like can be employed as a method of "color display" including other heretofore known display methods as long as they can secure the visibility of an operator. It is conceivable that any of the above items or a combination of some of the above items is used as a method of "color display".

Figure 6:
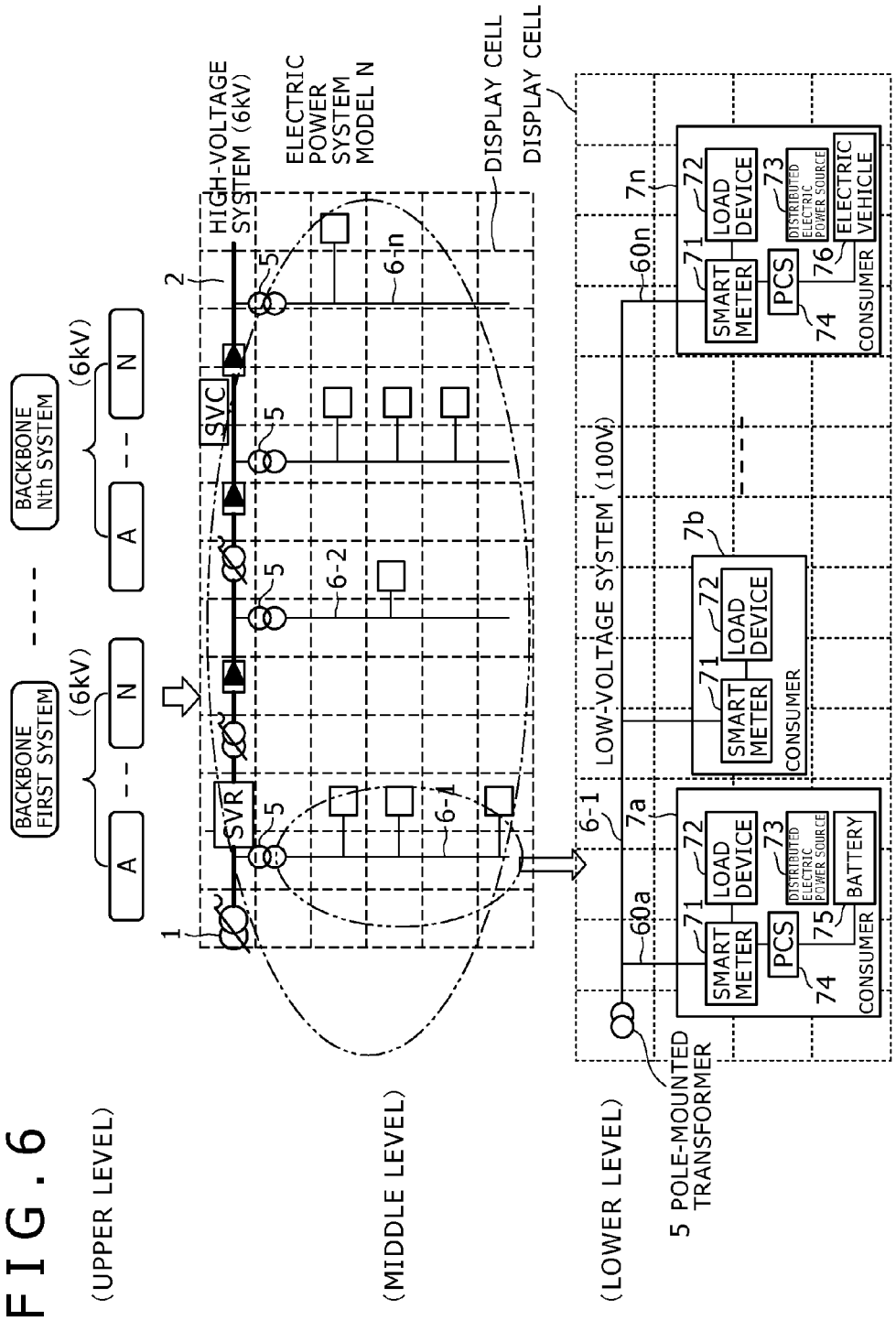
FIG. 6 is a diagram showing an example of the hierarchical structure of the electric power system information displayed on the display unit according to the first embodiment.

FIG. 6 is a diagram showing an example of the hierarchical structure of electric power system information displayed on the display unit 170 according to the first embodiment. This electric power system can be a system that covers the entirety of the electric power system of a certain electric power company or can be a system that covers a give range of the electric power system. In an example shown in FIG. 6, the electric power system includes plural backbone systems, each backbone system includes plural high-voltage systems 2, and each high-voltage system includes plural low-voltage systems 6 (6-1 to 6-n, 60a to 60n), and the electric power system is configured in such a way that any of the backbone systems, any of the high-voltage systems, and any of the low-voltage systems can be selectively displayed in the upper level, middle level, and lower level respectively. Only high-voltage systems are displayed in the upper level, one high-voltage system and all low-voltage systems coupled to the high-voltage system are displayed in the middle level, and only one low-voltage system is displayed I the lower level. The low-voltage systems 60 (60a to 60n) in the lowest level are displayed so as to correspond to final consumers 7 (7a to 7n) respectively one-on-one, information about the lower level is displayed in a degenerate form in the low-voltage systems 6 (6-1 to 6-n) of the middle level, and information about the middle level is displayed in a more degenerate form in the upper level. In other words, the configuration of the simulation model shown in FIG. 3A is displayed as it is in the display unit 170. Therefore, an operator can select an electric power system in any hierarchical level and can display it on the screen.

Here, if a control unit on the power-distribution-system simulation device 10, which corresponds to a cell unit, is defined as a control cell on the screen display area, the hierarchical structure of the electric power system information, and the distributions of consumer-load simulation units 80 and distributed electric-power-source simulation units 9 included in each control cell can be changed in accordance with the object of simulation. For example, other than a standard pattern shown in FIG. 3A, a pattern for an emergence situation, in which, for example, a control cell for a certain consumer to whom electric power has to be preferentially and urgently supplied and cells for general consumers can be easily distinguished, may be prepared.

Figure 7A:
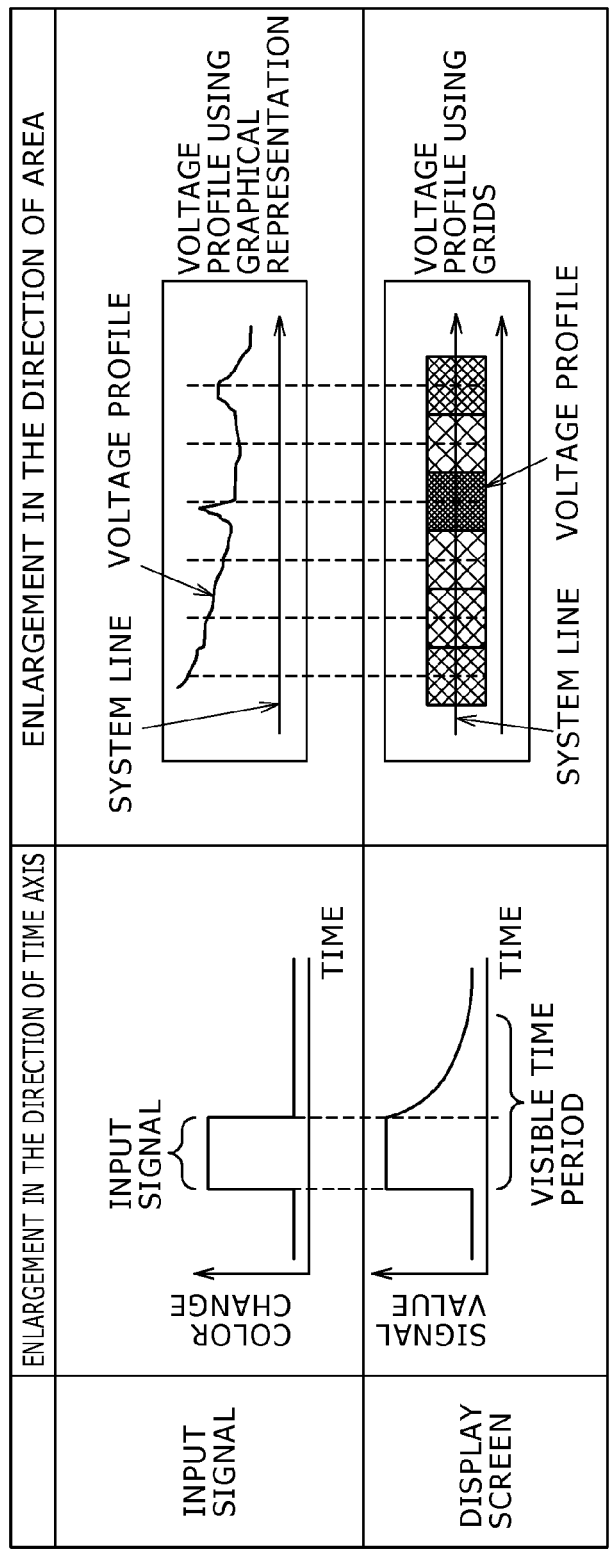
FIG. 7A is a diagram showing an example of a display method of the display unit according to the first embodiment.
Figure 7B:
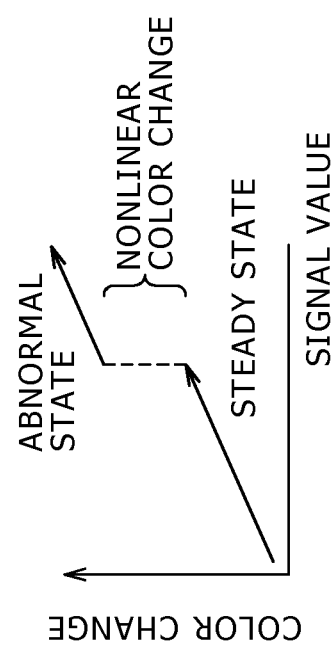
FIG. 7B is a diagram showing an example of a display method of the display unit according to the first embodiment.

FIG. 7A and FIG. 7B are diagrams showing an example of a display method of the display unit 170 according to the first embodiment. In the display unit 170, as shown in FIG. 7A, two points on the electric power system are shown, and at the same time, the signal characteristics between the two points are shown. In addition, genesis phenomena in the electric power system are displayed by converting temporal and areal resolutions. For example, when a signal change is replaced with a color change using plural display cells, a linear change is displayed in a normal situation, but a nonlinear change (for example, a bright-colored hop) is displayed when an abnormal behavior occurs as shown in FIG. 7B. As described above, the display method has a function to display an abnormal behavior so as to be grasped at first sight. Here, abnormalities of state quantities of voltage, current, frequency, power flow, and the like can be thought of as abnormal behaviors. Further, the power flow, which is specific to electric power, is visualized by a flow on a system line (flow shown by an arrow). It is also conceivable that a voltage profile, which is specific to electric power, is graphed in association with the system line. As for the abnormalities of state quantities, genesis phenomena including the causes for the abnormalities in the electric power system are displayed by converting the temporal and areal resolutions.

It is desirable that the following signals that are apt to be overlooked are displayed by converting the temporal and areal resolutions.

(a) A phenomenon that occurs for a short period and that is apt to be temporally overlooked if displayed as it is.

(b) A phenomenon that occurs in a local position of a system and that is apt to be overlooked in terms of size if displayed as it is.

In order to cope with these problems, the display control unit for first display area system lines 1802 and the display control for cell areas of first display area system 1803 are equipped with the following means or methods, which makes it possible to improve visibility.

(1) A temporally signal hold means (step type or attenuation type)

(2) An areal signal enlargement means (display cell)

In other words, the above case means that the display control unit for first display area system lines 1802 and the display control for cell areas of first display area system 1803 are equipped with a function for converting the temporal and areal resolutions.

Figure 8A:
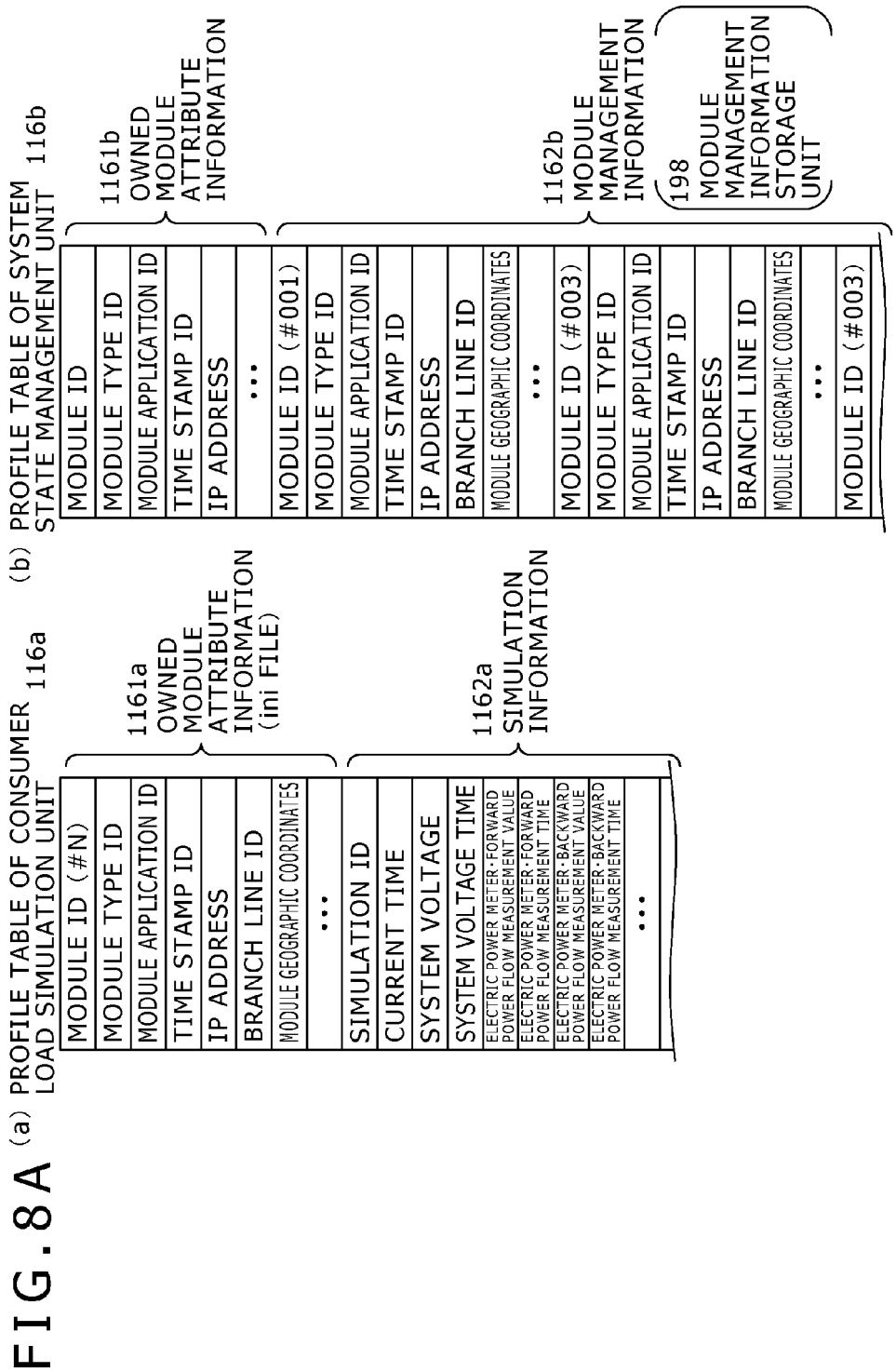
FIG. 8A is a diagram showing a configuration example of a profile table according to the first embodiment.

FIG. 8A is a diagram showing a configuration example of a profile table according to the first embodiment. FIG. 8A (a) shows an example of a profile table 116a of the consumer-load simulation unit 80, and FIG. 8A (b) shows an example of a profile table 116b of the management unit for states of independent distributed systems 1130. An operator can input data regarding a necessary profile item from a control terminal 17 via an input reception screen.

As shown in FIG. 8A (a), the profile table 116a of the consumer-load simulation unit 80 includes owned module attribute information 1161a and simulation information 1162a. The owned module attribute information 1161a includes pieces of information that specify the owned module such as module ID, module type ID, module application ID, time stamp ID, IP address, branch line ID, and module geographic coordinates.

The simulation information 1162a includes pieces of information that show the situation of simulation such as simulation ID, current time, system voltage, system voltage time, electric power meter•forward power flow measurement value, electric power meter•forward power flow measurement time, electric power meter•backward power flow measurement value, electric power meter•backward power flow measurement time.

Here, simulation ID is information for identifying the performance of a simulation; current time is time at which the simulation is running; system voltage is the value of voltage which is applied to a consumer 7 for whom the owned module performs the simulation; and system voltage time is time at which the system voltage is obtained. Further, electric power meter•forward power flow measurement value and electric power meter•backward power flow measurement value are respectively measurement values of forward power flow and backward power flow obtained from a smart meter 71 of the consumer 7 for whom the owned module performs the simulation.

The simulation information 1162a is information which a module application 111 of the owned module provides to the outside in order to show the simulation situation, Here, although FIG. 8A (a) shows an example of the profile table 116a of the consumer-load simulation unit 80, a profile table that has almost the same configuration as that of the profile table 116a can be used as a profile table 116 of the distributed electric-power-source simulation unit 90.

As shown in FIG. 8A (b), a profile table 116b of the management unit for states of independent distributed systems 1130 includes owned module attribute information 1161b and module management information 1162b. The profile table 116b of the management unit for states of independent distributed systems 1130 corresponds to information stored in the module management information storage unit 198 of the management unit for states of independent distributed systems 1130.

Figure 8B:
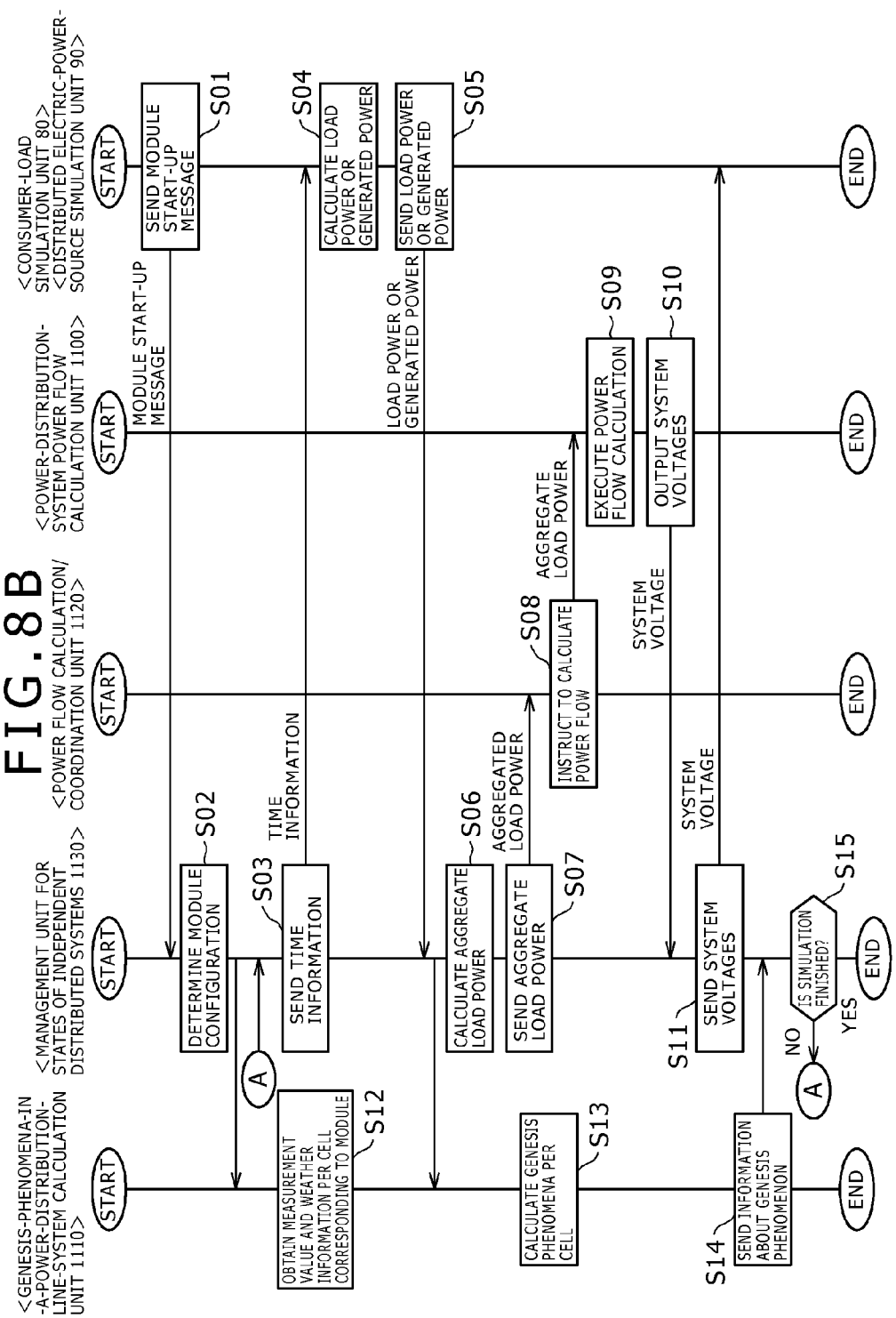
FIG. 8B is a diagram showing an example of an execution procedure of the electric power system simulation according to the first embodiment.

FIG. 8B is a diagram showing an example of an execution procedure of the electric power system simulation according to the first embodiment. Power-distribution-system simulation 10 is started when each consumer-load simulation unit 80 and each distributed electric-power-source simulation unit 90 respectively send module start-up messages to the management unit for states of independent distributed systems 1130 (S01). Here, the module start-up messages are messages respectively showing that each consumer-load simulation unit 80 and each distributed electric-power-source simulation unit 90 start executing programs of their modules. The management unit for states of independent distributed systems 1130 determines a module configuration, which is a simulation target, on the basis of the received module start-up messages (S02). Subsequently, the management unit for states of independent distributed systems 1130 sends time information used for performing the simulation to each consumer-load simulation unit 80 and each distributed electric-power-source simulation unit 90 that are targets to be managed in the simulation (S03). Each consumer-load simulation unit 80 and each distributed electric-power-source simulation unit 90 respectively calculate load power or generated power (S04), and the load power or generated power obtained by the calculations are sent to the management unit for states of independent distributed systems 1130 (S05).

Next, the management unit for states of independent distributed systems 1130 aggregates load powers and generated powers for each incoming line 6, that is, calculates aggregate load power 201 for a pole-mounted transformer 5 that is coupled to the incoming line 6 (S06), and sends the calculated aggregate load power 201 to the power flow calculation/coordination unit 1120 (S07). The power flow calculation/coordination unit 1120 instructs the power-distribution-system power flow calculation unit 1100 to calculate power flows on the power distribution line 2 while sending the aggregate load power to the power-distribution-system power flow calculation unit 1100 (S08). The power-distribution-system power flow calculation unit 1100 executes the instructed power flow calculation (S09), and outputs voltage values at individual points on the power distribution line 2 to the management unit for states of independent distributed systems 1130 (the voltage values at the individual points will be referred to as system voltages hereinafter) (S10).

The management unit for states of independent distributed systems 1130 sends those system voltages to individual consumer-load simulation units 80 and distributed electric-power-source simulation units 90 (S11), and judges whether the simulation should be finished or not (15). If the simulation is not finished, pieces of processing at S03 and after are repeatedly executed until the pieces of processing are finished.

The genesis-phenomena-in-a-power-distribution-system calculation unit 1110 obtains measurement values of display cells 1721 corresponding to a module to be displayed, weather information, and the like from the simulated monitoring/controlling device for independent distributed electric powers 110 in conjunction with the behavior of the management unit for states of independent distributed systems 1130 (S12), and calculates genesis phenomena per display cell 1721 (S13). This calculation result is sent to the screen display control unit 180 via the management unit for states of independent distributed systems 1130, and information about the calculation result is displayed on the display cells 1721 (S14).

Figure 9:
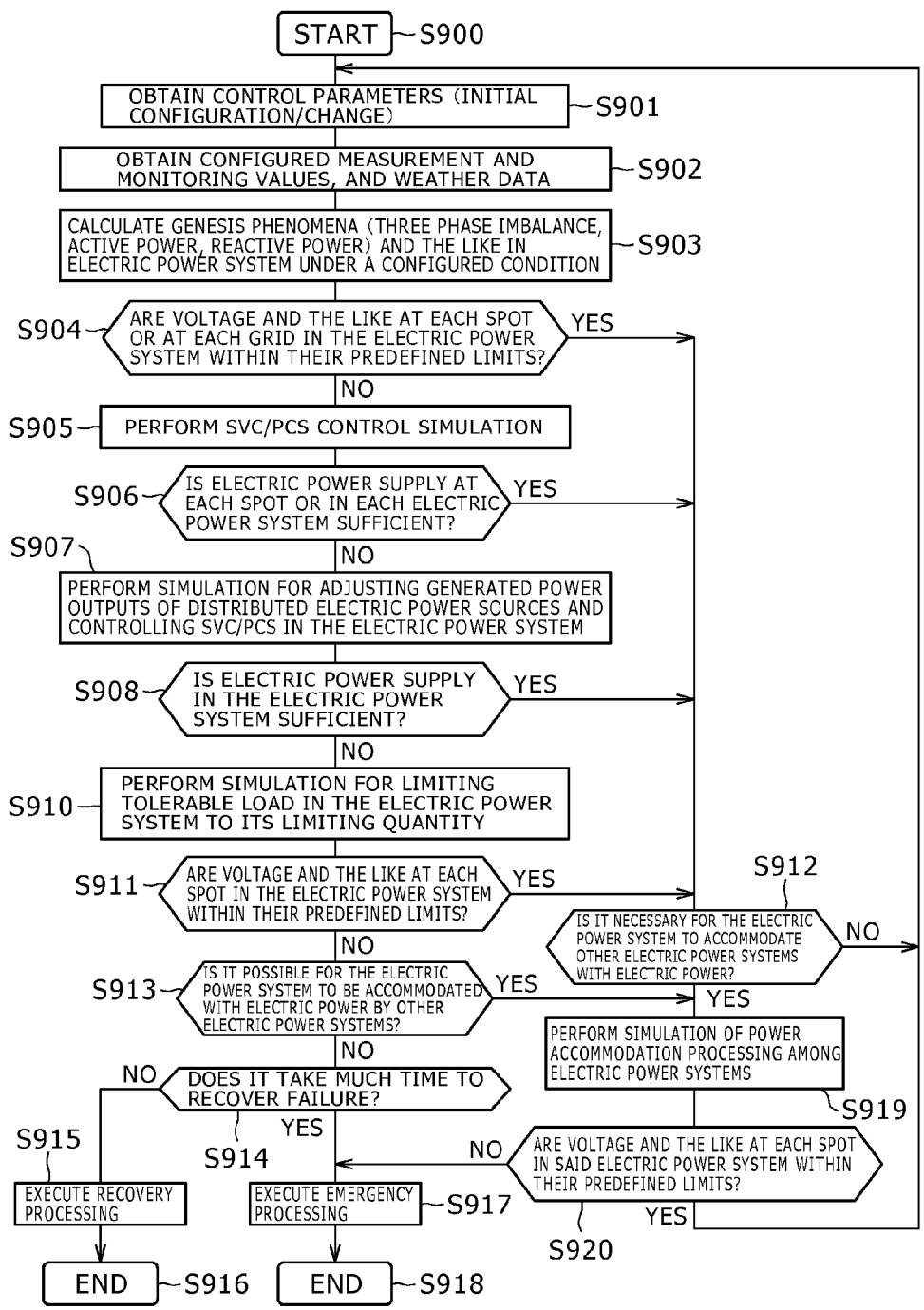
FIG. 9 is a diagram showing an example of an electric power adjustment procedure of the electric power system simulation according to the first embodiment.

FIG. 9 is a diagram showing an example of an electric power adjustment procedure of the electric power system simulation according to the first embodiment. First, control parameters (for initial configuration or change) about an electric power system to be a simulation target are obtained (S901), and configured measurement and monitoring values, and weather data are obtained (S902). Next, simulation is performed under a configured condition. In other words, genesis phenomena (three phase imbalance, active power, and reactive power) and the like in a specified electric power system are calculated (S903). Subsequently, it is judged whether a voltage and the like at each spot or at each grid in the electric power system are within their predefined limits or not (S904). If the voltage and the like are not within their predefined limits, after control parameters for SVCs/PCSs are changed, simulation is performed so that they fall within their predefined limits (S905). Next, it is judged whether electric power supply at each spot or at each grid in the electric power system is sufficient or not (S906). If the electric power supply is not sufficient, after the parameters of the generated power outputs of distributed electric power sources in the electric power system are adjusted and the control parameters for SVCs/PCSs are changed so that the electric power supply at each spot or at each grid falls within its limits, simulation is performed (S907). After the simulation, it is judged whether the electric power supply in the electric power system is sufficient or not (S908). If the electric power supply is not sufficient, after the control parameters are changed to limit tolerable load in the electric power system to its limiting quantity, simulation is performed (S910). Subsequently, it is judged whether a voltage and the like at each spot or at each grid in the electric power system are within their predefined limits or not (S911). If the judgment result of any of the above judgments at S904, S906, S908, and S911 is "YES", it is judged whether it is necessary for the electric power system to accommodate other electric power systems with electric power or not (S912). If it is not necessary, the flow goes back to S901, and the same pieces of processing are repeated after some new parameters are configured to a necessary extent. On the other hand, if it is necessary, simulation of power accommodation between the electric power system and others is performed (S919), and then it is judged whether the voltage and the like at each spot or at each grid in the electric power system are within their predefined limits or not (S920). If the judgment result is "YES", the flow goes back to S901, and the same pieces of processing are repeated to a necessary extent.

On the other hand, if the judgment result is "NO" at S911, it is judged whether it is possible for the electric power system to be accommodated with electric power by other electric power systems or not (S913). If the judgment result is "YES", the flow proceeds to S919. On the other hand, if the judgment result is "NO", it is judged whether it takes much time to recover a failure in the electric power system or not (S914). If it does not take much time, the recovery processing is executed (S915), and the electric power adjustment ends (S916). If it takes much time, an emergency measure such as a first-aid treatment is taken (S917), and the electric power adjustment ends (S918).

Figure 10:
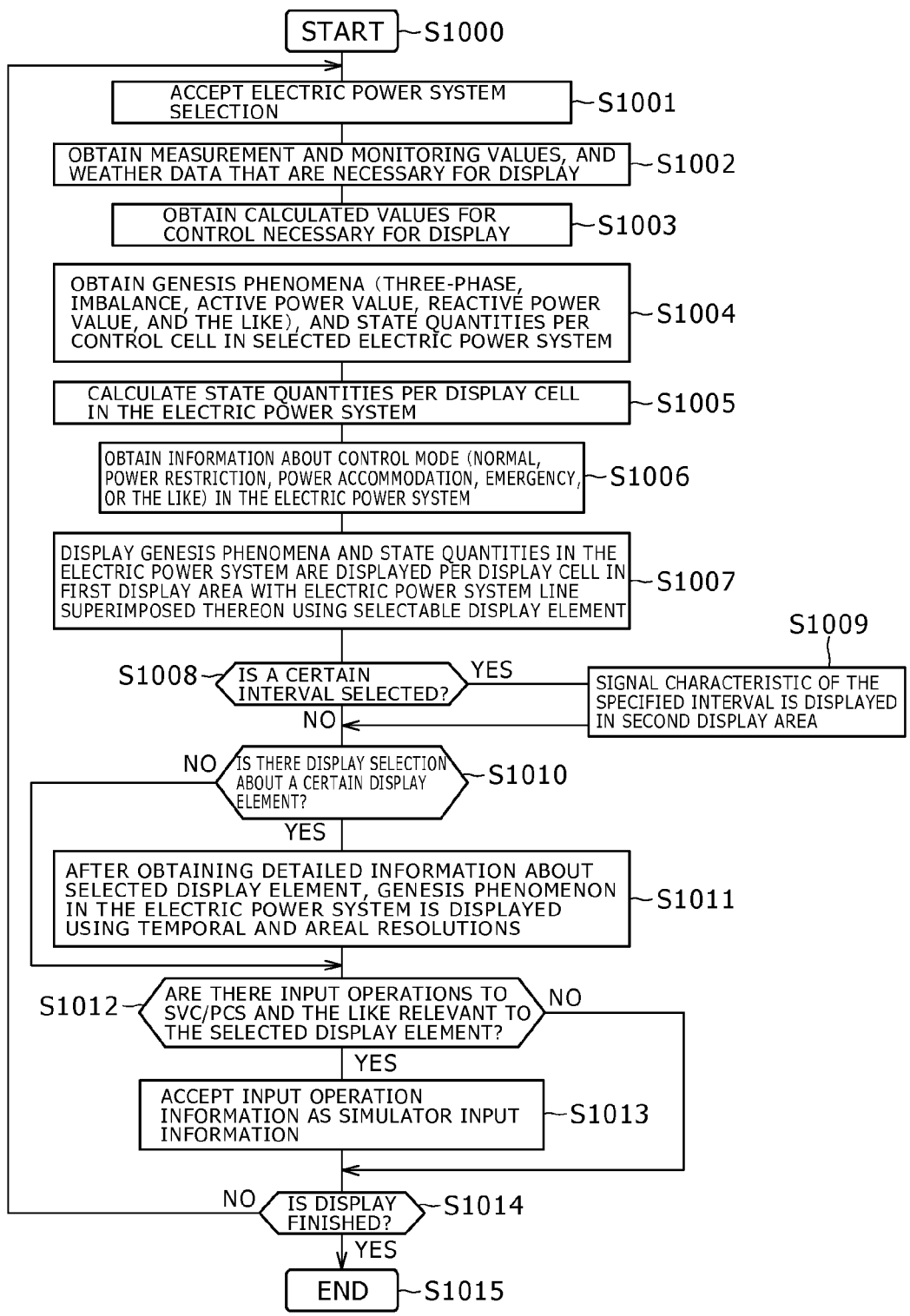
FIG. 10 is a diagram showing an example of a procedure of a display method executed on the display unit in accordance with the electric power adjustment procedure shown in FIG. 9.

Next, using FIG. 10, an example of a procedure of a display method executed on the display unit 170 in accordance with the electric power adjustment procedure shown in FIG. 9 will be explained.

First, the selection of an electric power system is accepted (S1001). In other words, the selection of an electric power system to be displayed or a power distribution system to be displayed (the electric power system or the power distribution system will be simply referred to as the electric power system hereinafter) is accepted via the electric power system and area selection menu 175 and the like. Subsequently, measurement and monitoring values, weather data, and the like that are necessary for displaying a selected electric power system or a selected power distribution system (the selected electric power system or the selected power distribution will be referred to the electric power system hereinafter) are obtained (S1002). Next, calculated values for control that are necessary for display are obtained (S1003). In addition, information about genesis phenomena in the electric power system selected using the display selection menu 174 of the first display area 171 and the like is obtained (S1004). For example, the values of phenomena, such as the values of three-phase imbalance, active power, and reactive power, and other state quantities per control cell are obtained. Subsequently, the state quantities per display cell in the electric power system are calculated (S1005). Further, information about a control mode (normal, power restriction, power accommodation, emergency, or the like) in the electric power system is obtained (S1006). The genesis phenomena and state quantities in the electric power system are displayed per display cell in the first display area 171 of the display unit 170 with the electric power system line superimposed thereon using the selectable display element (S1007). If a certain interval is selected in the electric power system (S1008), the signal characteristic of the specified interval is displayed in the second display area (S1009). If there is display selection about a certain display element (S1010), after detailed information about the selected display element is obtained in the third display area 173, a genesis phenomenon in the electric power system is displayed using temporal and areal resolutions (S1011). In addition, if there are input operations to SVC/PCS and the like relevant to the selected display element (S1012), the information about the input operations is accepted as simulation input information (S1013). Subsequently, the same pieces of processing are repeated until the display procedure is finished (S1014 and S1015).

Figure 11A:
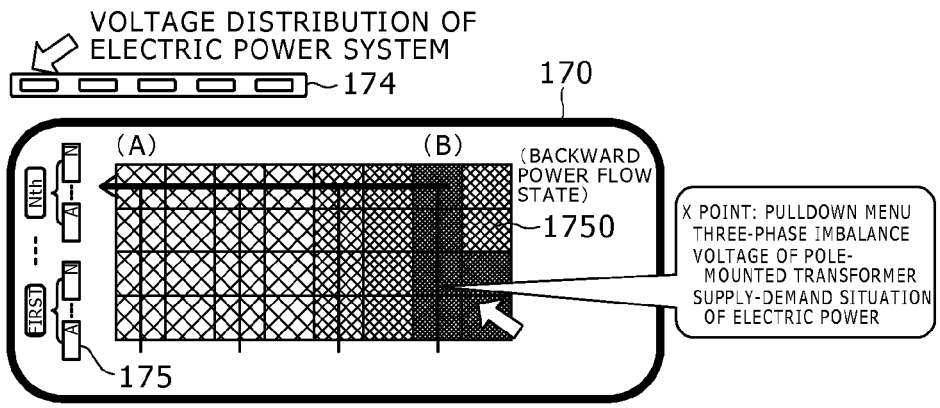
FIG. 11A is a diagram showing the display method executed on the display unit in accordance with the electric power adjustment procedure shown in FIG. 9 and an example of the usage configuration of the display method.

Using FIG. 11A to FIG. 11D, a display method executed on the display unit 170 in accordance with the electric power adjustment procedure shown in FIG. 9, and an example of the usage configuration of the display method will be explained. FIG. 11A is a diagram showing the screen of the first display area 171 in the case where an operator selects one electric power system to be displayed or one power distribution line system to be displayed using the electric power system and area selection menu 175 in the first display area 171 of the display unit 170, and at the same time, selects "electric power system voltage distribution" using the display selection menu 174. In this screen, it is indicated that a backward power flow exists in the selected power distribution line system by an arrow and the like. This case corresponds to the case where the judgment at S904 in FIG. 9 is "NO". This state of backward power flow occurrence can be grasped from the distribution chart of energy between points A and B of the power distribution line 2 shown in the second display area 172. In addition, the voltage distribution is also displayed per display cell in the first display area 171. In order to check a cause for the backward power flow occurrence, the operator clicks a display element 1713 out of display cells of an area with a high voltage distribution to know the state of X point, for example, selects data of the point from the pull-down menu, and displays the data in the third display area 173, which makes it possible for the operator to check details.

Figure 11B:
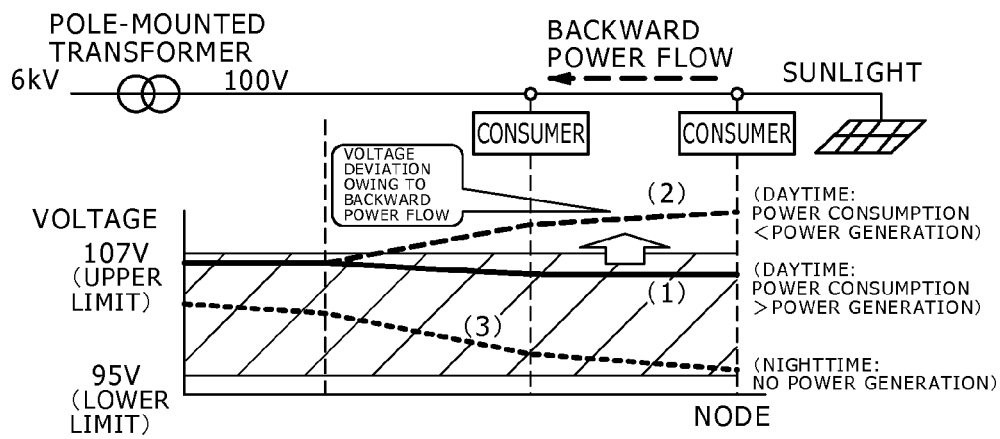
FIG. 11B is a diagram showing the state of an electric power system corresponding to FIG. 11A.
Figure 11C:
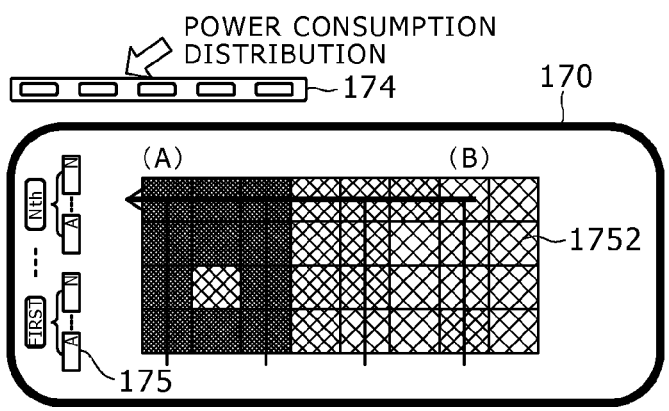
FIG. 11C is a diagram showing the display method executed on the display unit in accordance with the electric power adjustment procedure shown in FIG. 9 and an example of the usage configuration of the display method.
Figure 11D:
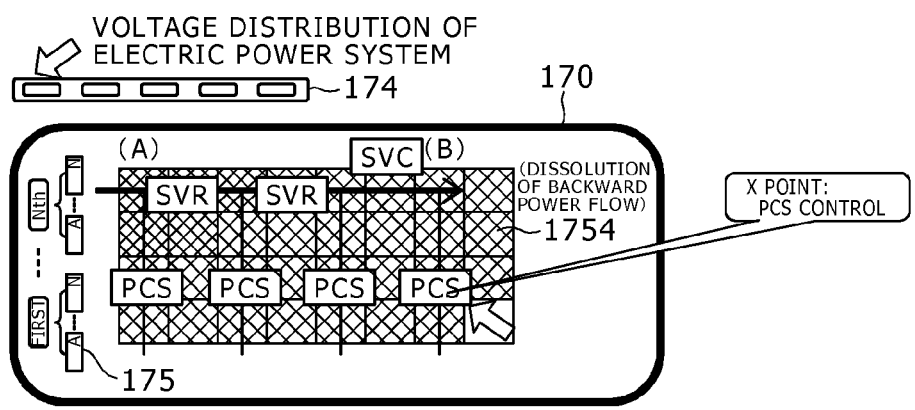
FIG. 11D is a diagram showing the display method executed on the display unit in accordance with the electric power adjustment procedure shown in FIG. 9 and an example of the usage configuration of the display method.

For example, a situation shown in FIG. 11B can be thought of as a cause for the backward power flow occurrence. In other words, this is the case where, because there are a larger number of households that are equipped with photovoltaic power generation systems, which are distributed electric power sources, in the region including X point in comparison with other regions, the amount of generated power is larger than the amount of power consumption during the daytime and the voltage of the corresponding incoming line 6 is over the control tolerance 107 V. Therefore, the operator displays "power consumption distribution" in the state where this backward power flow is occurring on the screen of the first display area 171 using the display selection menu 174. The state is shown in FIG. 11C, and it may be understood that there are a great deal of demands for "power consumption" on the side near to point A. In view of this result, the operator performs simulation again after changing the control parameters of PCSs and SVCs at various points including X point so that the voltages of the power distribution line 2 and incoming lines 6 may fall within their control tolerances all over the areas. The above operations correspond to pieces of processing of S905 and S906 in FIG. 9. Whether the voltages of the power distribution line 2 and incoming lines 6 have fallen within their control tolerances all over the areas or not can be judged by selectably displaying "electric power system voltage distribution" on the screen of the first display area 171. FIG. 11D is a diagram showing the state where the electric power adjustment has been performed as described above.

Figure 12A:
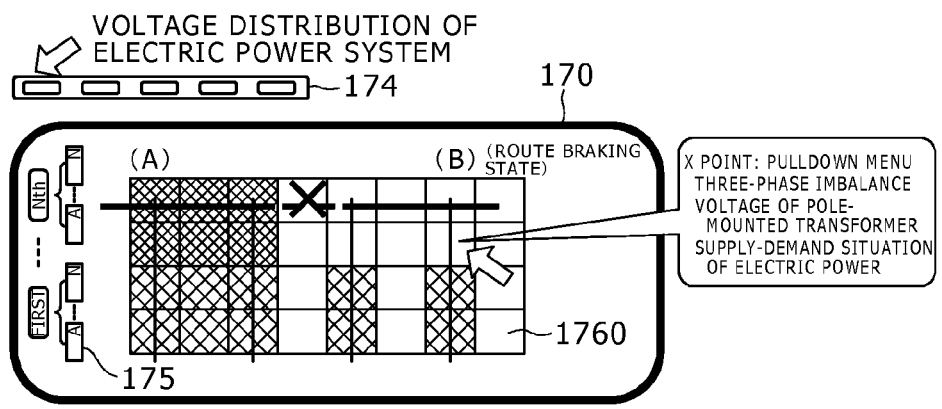
FIG. 12A is a diagram showing the display method executed on the display unit in accordance with the electric power adjustment procedure shown in FIG. 9 and another example of the usage configuration of the display method.
Figure 12B:
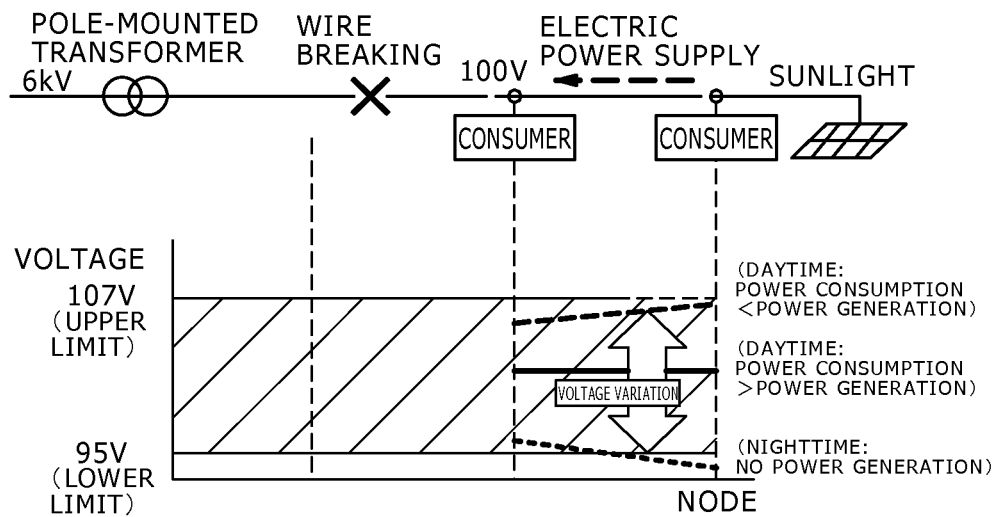
FIG. 12B is a diagram showing the state of an electric power system corresponding to FIG. 12A.
Figure 12C:
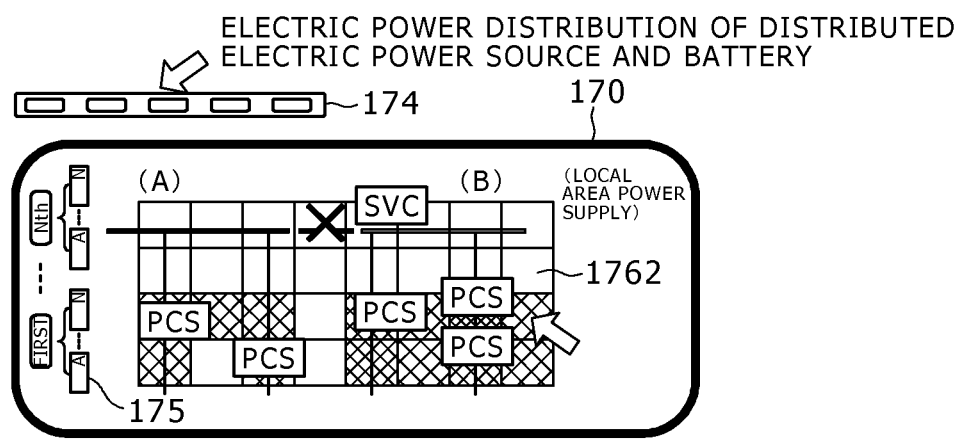
FIG. 12C is a diagram showing the display method executed on the display unit in accordance with the electric power adjustment procedure shown in FIG. 9 and another example of the usage configuration of the display method.
Figure 12D:
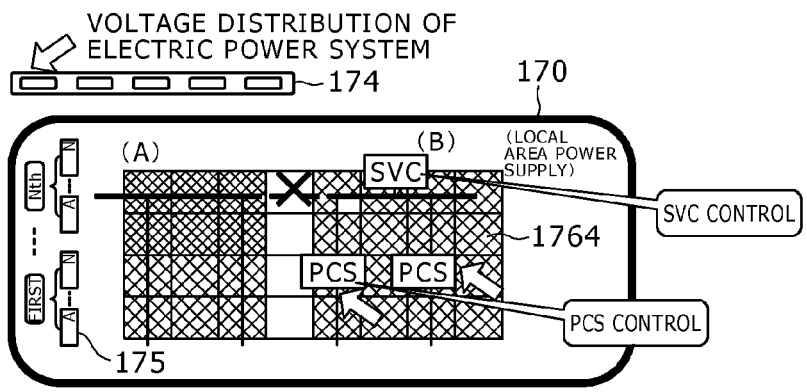
FIG. 12D is a diagram showing the display method executed on the display unit in accordance with the electric power adjustment procedure shown in FIG. 9 and another example of the usage configuration of the display method.

Using FIG. 12A to FIG. 12D, an example of a procedure of a display method executed on the display unit 170 in accordance with the electric power adjustment procedure shown in FIG. 9 will be explained. FIG. 12A is a diagram showing that a breaking exists in the power distribution line system, which is selected by the operator, by sign x in the middle of the power distribution line 2. In addition, "electric power system voltage distributions" in two local areas in the upstream side and downstream side of the point where the breaking exists are also displayed. In view of this result, the operator takes an emergency measure using a distributed electric power source, a battery, an electric vehicle, and the like. The operator displays "distribution of powers of distributed electric power sources and batteries" on the screen of the first display area 171 by operating the display selection menu 174. The screen of the first display area 171 in the above case is shown in FIG. 12C, and it may be understood that "powers of distributed electric power sources and batteries" can be utilized at plural spots in both upstream side and downstream side of the point where the breaking exists. In view of this result, the operator performs simulation again after changing the control parameters of PCSs and SVCs at various points including X point so that the voltages of the power distribution line 2 and incoming lines 6 may fall within their control tolerances all over the areas. In this case, the operator performs the above operation individually in the local area of the upstream side and in the local area of the downstream side of the point where the breaking exists. The above operations correspond to pieces of processing of S907 and S908 (or S915 and S917) in FIG. 9, for example. Whether the voltages of the power distribution line 2 and incoming lines 6 have fallen within their control tolerances all over the areas or not can be judged by selectably displaying "electric power system voltage distribution" on the screen of the first display area 171. FIG. 12D is a diagram showing the state where the electric power adjustment has been performed as described above.

Here, although the simulation device according to the present invention has to include a function for outputting the above pieces of information on the display unit 170, it goes without saying that the concrete configuration of the simulation device is not limited to the configuration described in FIG. 3A and FIG. 3B.

According to this embodiment, even if a large number of distributed electric power sources are introduced to a power distribution system, voltage control technology that can promptly take measures to cope with the increase and variation of voltage owing to the variations of output electric powers can be established by an operator's performing simulation using the display of the display unit 170 that provides excellent visibility, with the result that it becomes possible to develop a system that can sustain the stable quality of electric power. In addition, problems associated with the complexity of power flow management owing to difficulty to grasp the generated electric energy of distributed electric power sources and difficulty to grasp the real loads of general consumers can be solved by repeatedly performing simulation using the display of the display unit 170 that provides excellent visibility, with the result that it becomes possible to develop a system that can stably and appropriately operate an electric power system.

Second Embodiment

Figure 13:
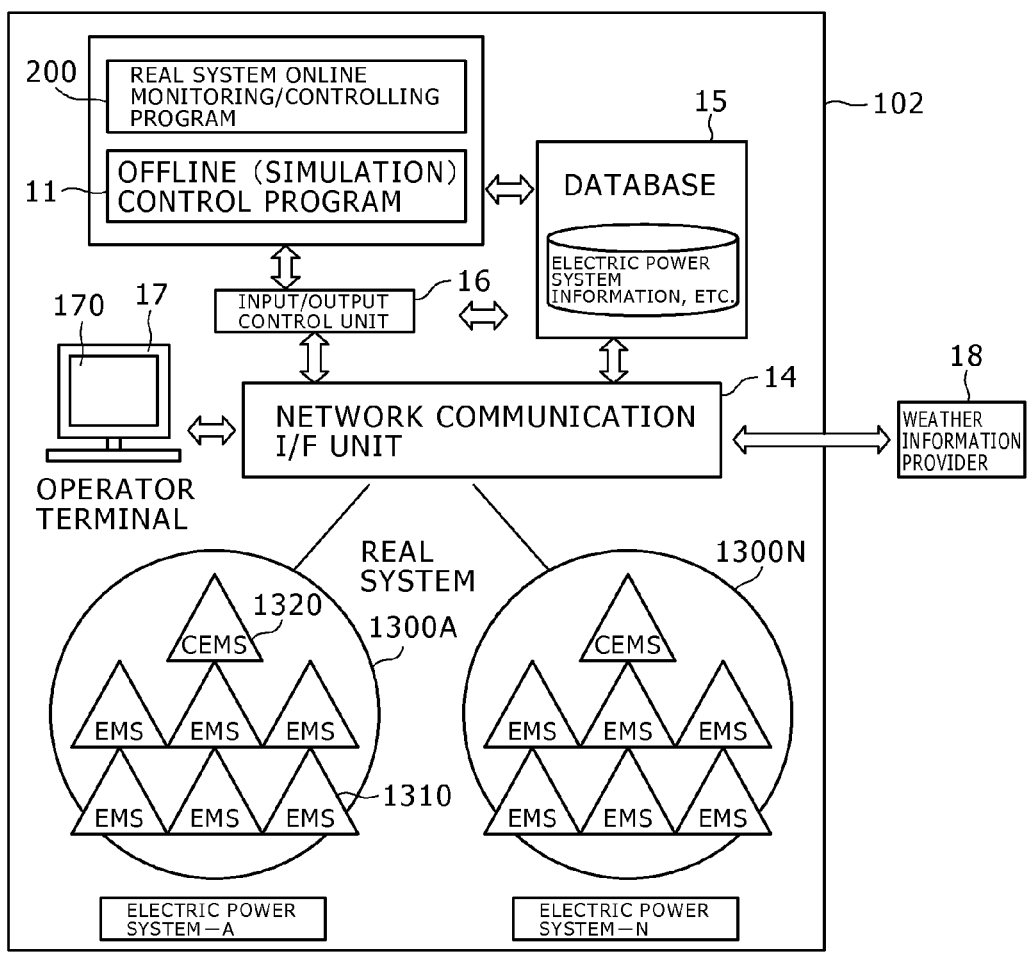
FIG. 13 is a diagram showing a configuration example of the entirety of an electric power system control device, into which an electric power system simulation device is incorporated, according to a second embodiment of the present invention.

FIG. 13 is a diagram showing a configuration example of the entirety of an electric power system control device according to a second embodiment of the present invention. In other words, the electric power system control device according to this embodiment is an electric power system control device that executes "power distribution system" control in a practical electric power system (real system) and into which the electric power system simulation device according to the first embodiment incorporated.

An electric power system control device 102 shown in FIG. 13 includes a real system online monitoring/controlling program 200, and is configured so as to be capable of controlling power distribution systems A to N that are control targets and real systems. In other words, the electric power system control device according to this embodiment is equipped with both control function for a real system as shown in FIG. 2 and control function for a simulation model as shown in FIG. 3. The control function for the real system is fundamentally the same as the control function for a simulation model described in the first embodiment, and is different from the control function for the simulation model in that data that the control function for the real system deals with are not simulation values but real values, and the configuration and data of the simulation model for the real system are sequentially changed in accordance with the changes of and additions to power distribution systems, consumers, distributed electric power sources, and the like in the real system. Therefore, matters specific to the control function of the real system will be mainly described hereinafter.

Figure 14:
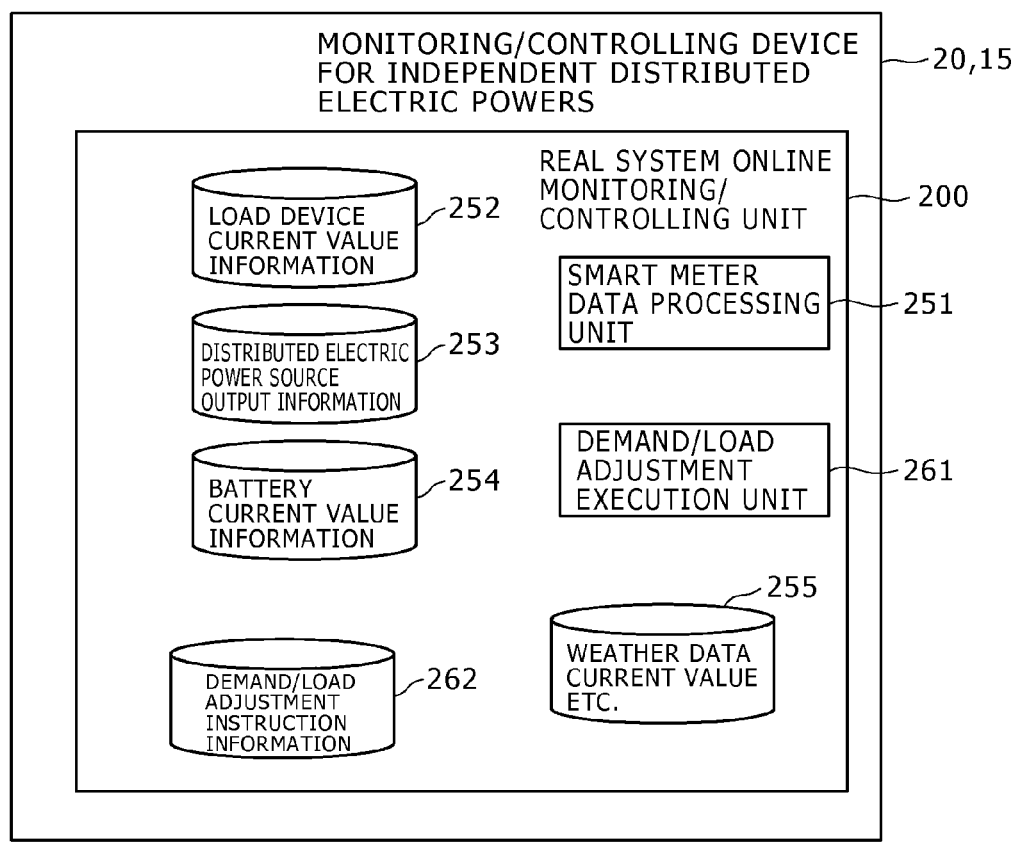
FIG. 14 is a diagram showing examples of the functional blocks of a control unit of the electric power system control device according to the second embodiment.

FIG. 14 is a diagram showing examples of the functional blocks of a control unit 20 of the electric power system control device 102 according to the second embodiment. This control unit 20 can be realized by a computer including a CPU and a storage device having RAMs and a hard disk. A monitoring/controlling device for independent distributed electric powers 200 of the control unit 20 includes a smart-meter data processing unit 251, a demand/load adjustment execution unit 261, and further includes load device current value information 252, distributed electric power source output information 253, battery current value information 254, weather data current value and the like 255, etc. as a database. The monitoring/controlling device for independent distributed electric powers 200 includes demand/load adjustment instruction information 262 as well. The monitoring/controlling device for independent distributed electric powers 200 enables the calculation of the coordination available capacity of distributed electric power sources, and the calculation of voltage distributions, short-circuit capacities, and the like at the time of distributed electric power source coordination using power flow calculation. In addition, data of electric poles, high-voltage lines, switches, voltage regulators, and the like are automatically brought in by coordinating the measurement data of a power distribution automation system, which makes it possible to execute analysis and control on a basis of the actual situation.

A server of an electric power company collects electric power consumption and backward power flow from a smart meter installed in each household in appropriate intervals, and further collects various information from various devices installed in an electric power system, and can perform the voltage management about the power distribution lines on the basis of collected data and estimated values calculated by some kind of algorithm based on the collected data.

FIG. 15 is a diagram showing a configuration example of a profile table of consumer-load current value information according to the second embodiment. This table is different in that this table stores data of the real system instead of simulation values of the profile table shown in FIG. 8A.

Figure 16:
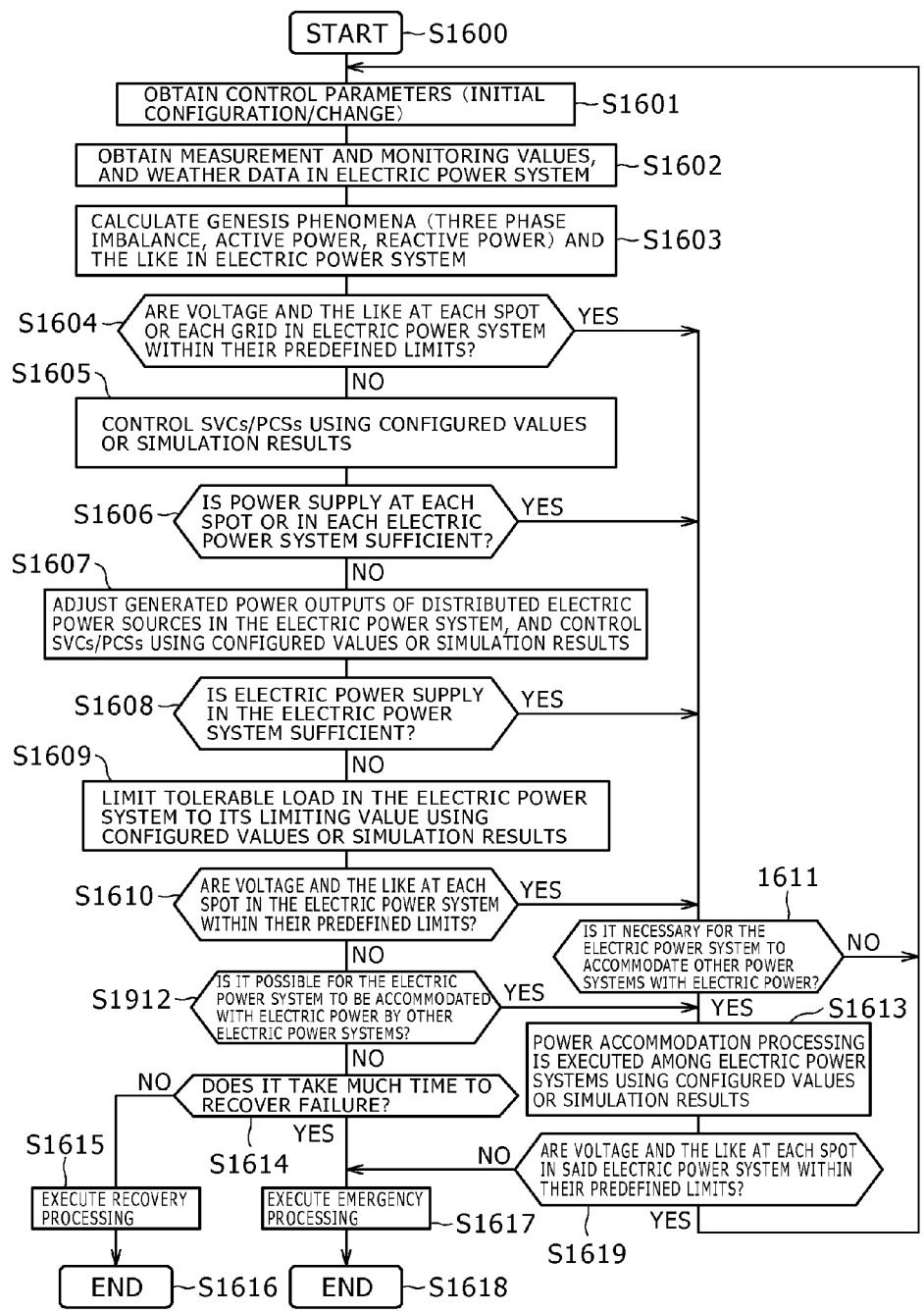
FIG. 16 is a diagram showing an example of an electric power adjustment procedure of the electric power system control device according to the second embodiment.

FIG. 16 is a diagram showing an example of an electric power adjustment procedure executed by the electric power system control device according to the second embodiment. First, control parameters (initial configuration/change) regarding an electric power system, which is a control target, is obtained (S1601), and measurement and monitoring values and weather data in the real system are obtained (S1602). Genesis phenomena (three-phase imbalance, active power, reactive power) and the like in the electric power system of the real system are calculated (S1603). Subsequently, it is judged whether a voltage and the like at each spot or each grid are within their predefined limits or not (S1604). If not within their predefined limits, the control parameters of SVCs/PCSs are changed so that the voltage and the like at each spot or each grid fall within their predefined limits (S1605). In this case, the processing results of the incorporated electric power system simulation device may be used. Next, it is judged whether power supply at each spot or each grid is sufficient or not in the electric power system (S1606). If the power supply is not sufficient, the parameters of the generated power outputs of distributed electric power sources in the electric power system are adjusted and the control parameters of SVCs/PCSs are changed in the electric power system so that the power supply falls within its limits (S1607). In this case, the processing results of the incorporated electric power system simulation device may be used. Subsequently, it is judged whether electric power supply in the electric power system is sufficient or not (S1608). If the electric power supply is not sufficient, control parameters are changed so that the tolerable load in the electric power system is limited to its limiting value (S1609). In this case, the processing results of the incorporated electric power system simulation device may be used. Next, it is judged whether a voltage and the like at each spot or each grid are within their predefined limits or not (S1610). If the judgment result of any of the above judgments at S1604, S1606, S1608, and S1610 is "YES", it is judged whether it is necessary for the electric power system to accommodate other electric power systems with electric power or not (S1611). If it is not necessary, the flow goes back to S1601, and the same pieces of processing are repeated after some new parameters are configured to a necessary extent. On the other hand, if it is necessary, after simulation is performed to a necessary extent, power accommodation between the electric power system and others is performed (S1613), and then it is judged whether the voltage and the like at each spot or at each grid in the electric power system are within their predefined limits or not (S1619). If the judgment result is "YES", the flow goes back to S1601, and the same pieces of processing are repeated to a necessary extent (S1619).

On the other hand, if the judgment result is "NO" at S110, it is judged whether it is possible for the electric power system to be accommodated with electric power by other electric power systems or not (S1612). If the judgment result is "YES", the flow proceeds to S1613. On the other hand, if the judgment result is "NO", it is judged whether it takes much time to recover a failure in the electric power system or not (S1614). If it does not take much time, the recovery processing is executed (S1615), and the electric power adjustment ends (S1616). If it takes much time, an emergency measure such as a first-aid treatment is taken (S1617), and the electric power adjustment ends (S1618).

In this system, information about measurement and monitoring values, and information about individual control devices are transferred to the monitoring/controlling device for independent distributed electric powers 200 via a communication network, and the monitoring/controlling device grasps the voltage distribution all over the power distribution system through power flow calculation, and determines control amounts for individual devices using an optimal calculation method. Therefore, control task assignment becomes possible in such a way that the individual devices locally take measures to control the voltage variations of short cycles, and the monitoring/controlling device issues instructions for controlling the variations of long cycles so that the entirety of the power distribution system becomes in an optimal state.

Figure 17A:
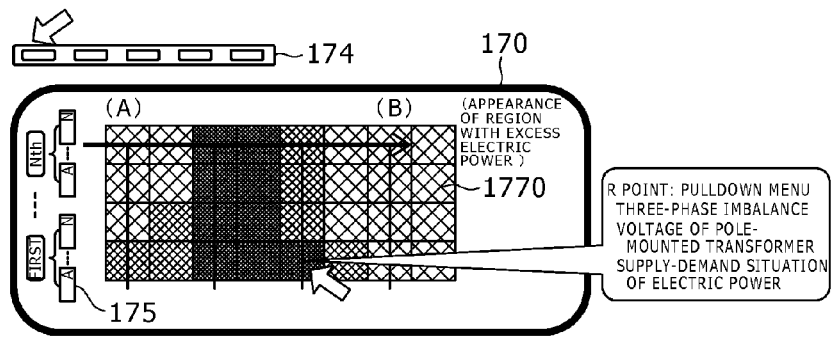
FIG. 17A is a diagram showing an example of a procedure of a display method executed on a display unit in accordance with the electric power adjustment procedure shown in FIG. 16 and an example of the usage configuration of the display method.
Figure 17B:
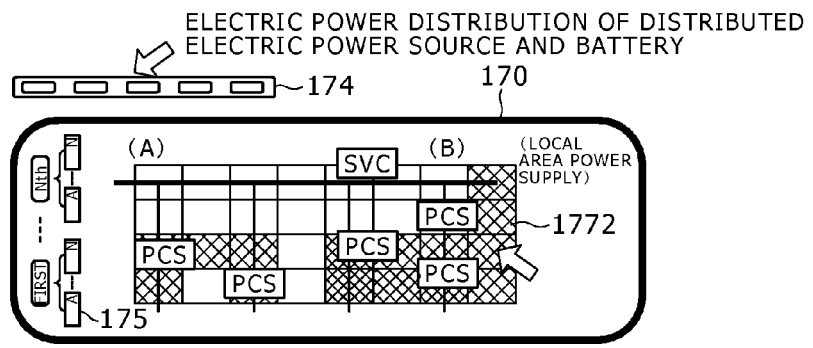
FIG. 17B is a diagram showing an example of a procedure of a display method executed on the display unit in accordance with the electric power adjustment procedure shown in FIG. 16 and an example of the usage configuration of the display method.
Figure 17C:
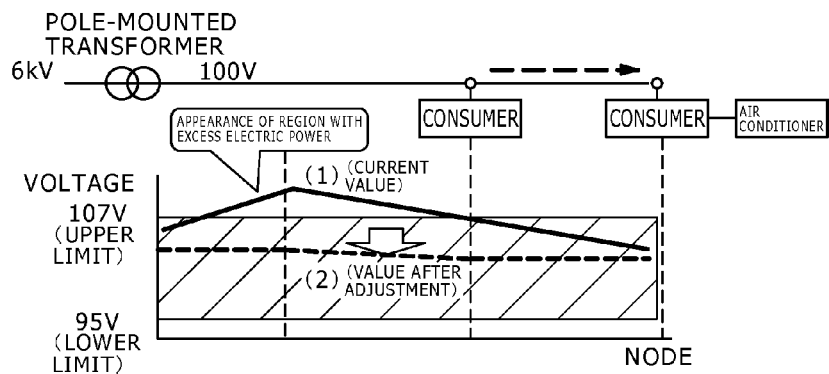
FIG. 17C is a diagram showing the states of an electric power system corresponding to FIG. 17A and FIG. 17B.

Using FIG. 17A to FIG. 17C, a display method executed on the display unit 170 in accordance with the electric power adjustment procedure shown in FIG. 16, and an example of the usage configuration of the display method will be explained. FIG. 17A is a diagram showing the screen of the first display area 171 in the case where an operator selects one electric power system to be displayed or one power distribution line system to be displayed using the electric power system and area selection menu 175 in the first display area 171 of the display unit 170, and at the same time, selects "electric power system voltage distribution" using the display selection menu 174. In this screen, it is indicated that excess voltages exist in certain areas. This case corresponds to the case where the judgment at S1604 in FIG. 16 is "NO". In addition, the voltage distribution is also displayed per display cell in the first display area 171. In order to check a cause for the excess voltages, the operator clicks a display element 1713 out of display cells of an area with a high voltage distribution to know the state of R point, for example, selects data of the point from the pull-down menu, and displays the data in the third display area 173, which makes it possible for the operator to check details. Therefore, the operator displays "electric power distribution of distributed electric power source and battery" in the state where these excess voltages are occurring on the screen of the first display area 171 using the display selection menu 174. The state is shown in FIG. 17B, and it may be understood that there are a great deal of demands for "power consumption" in plural areas. In view of this result, the operator performs simulation after changing the control parameters of PCSs and SVCs at various points including X point so that the voltages of the power distribution line 2 and incoming lines 6 may fall within their control tolerances all over the areas, and changes the control parameters of SVCs of the real system on the basis of the simulation result. The above operations correspond to pieces of processing of S1605 and S1626 in FIG. 16. Whether the voltages of the power distribution line 2 and incoming lines 6 have fallen within their control tolerances all over the areas or not can be judged by selectably displaying "electric power system voltage distribution" on the screen of the first display area 171. FIG. 17C is a diagram showing the state where the electric power adjustment has been performed as described above.

Figure 18A:
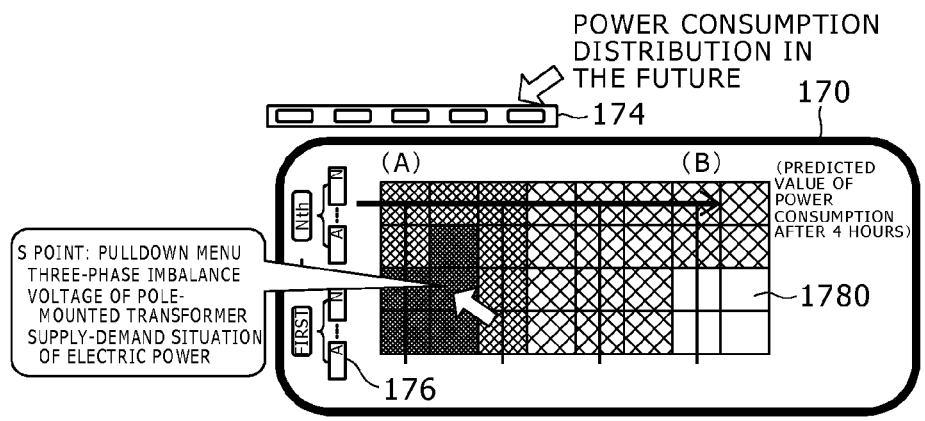
FIG. 18A is a diagram showing an example of a procedure of a display method executed on the display unit in accordance with the electric power adjustment procedure shown in FIG. 16 and another example of the usage configuration of the display method.
Figure 18B:
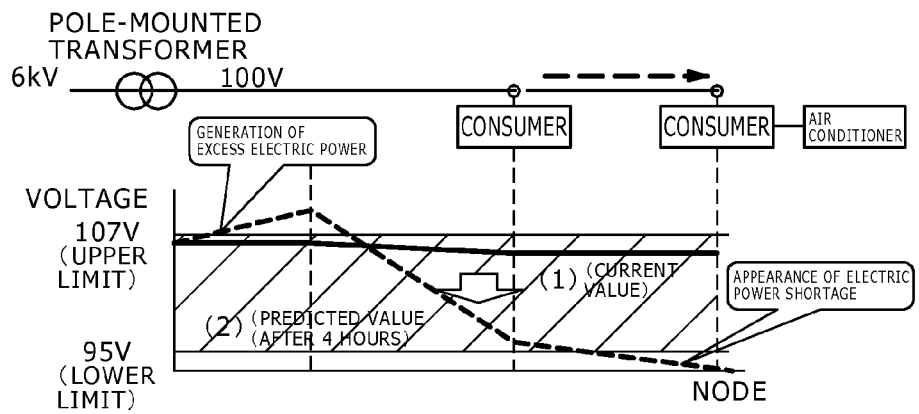
FIG. 18B is a diagram showing the state of an electric power system corresponding to FIG. 18A.

Using FIG. 18A to FIG. 18C, a display method executed on the display unit 170 in accordance with the electric power adjustment procedure shown in FIG. 16, and an example of the usage configuration of the display method will be explained. FIG. 17A is a diagram showing the screen of the first display area 171 in the case where an operator selects one electric power system to be displayed or one power distribution line system to be displayed using the electric power system and area selection menu 175, and at the same time, selects "power consumption distribution in the future" using the display selection menu 174. In this screen, it is indicated that excess voltages and electric shortages will occur in certain areas, for example, after four hours. In other words, the voltage distribution is also displayed per display cell in the first display area 171. In addition, FIG. 18B is a diagram showing the levels of the excess voltages and electric power shortages along the power distribution line system. This case corresponds to the case where the judgment at S1604 in FIG. 16 is "NO". In order to check a cause for anticipation of the excess voltages and electric power shortages, the operator clicks a display element 1713 out of display cells of an area with a high voltage distribution to know the state of R point, for example, selects data of the point from the pull-down menu, and displays the data in the third display area 173, which makes it possible for the operator to check details. Therefore, the operator displays "electric power distribution of distributed electric power source and battery" in the state where these excess voltages exist on the screen of the first display area 171 using the display selection menu 174. In view of this result, the operator performs simulation after changing the control parameters of PCSs and SVCs at various points including X point so that the voltages of the power distribution line 2 and incoming lines 6 may fall within their control tolerances all over the areas, and changes the control parameters of SVCs of the real system on the basis of the simulation result. The above operations correspond to pieces of processing of S1605 and S1626 in FIG. 16. Whether the voltages of the power distribution line 2 and incoming lines 6 have fallen within their control tolerances all over the areas or not can be judged by selectably displaying "electric power system voltage distribution" on the screen of the first display area 171.

Figure 18C:
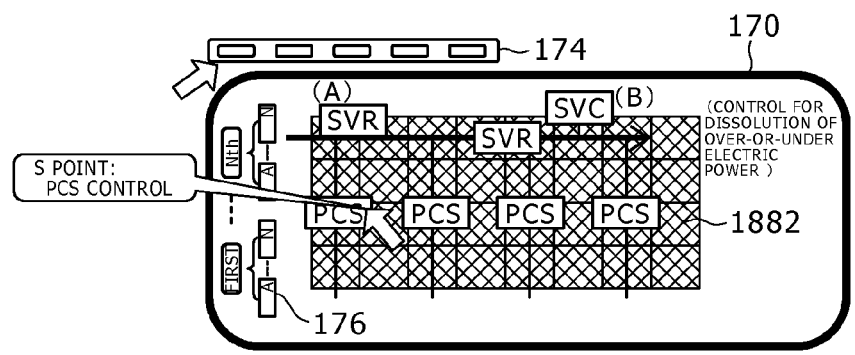
FIG. 18C is a diagram showing an example of a procedure of a display method executed on the display unit in accordance with the electric power adjustment procedure shown in FIG. 16 and another example of the usage configuration of the display method.

FIG. 18C is a diagram showing the state where the electric power adjustment has been performed as described above.

According to this embodiment, even if a large number of distributed electric power sources are introduced to a power distribution system, voltage control technology that can promptly take measures to cope with the increase and variation of voltage owing to the variations of output electric powers can be secured by the operator's performing simulation using the display of the display unit 170 that provides excellent visibility at the same time when the operator executes monitoring/controlling of "power distribution system" in the real system, with the result that it becomes possible for the electric power system to sustain the stable quality of electric power. In addition, problems associated with the complexity of power flow management owing to difficulty to grasp the generated electric energy of distributed electric power sources and difficulty to grasp the real loads of general consumers can be solved by performing simulation using the display of the display unit 170 that provides excellent visibility at the same time, with the result that it becomes possible to operate the electric power system stably and appropriately.

Third Embodiment

Figure 19:
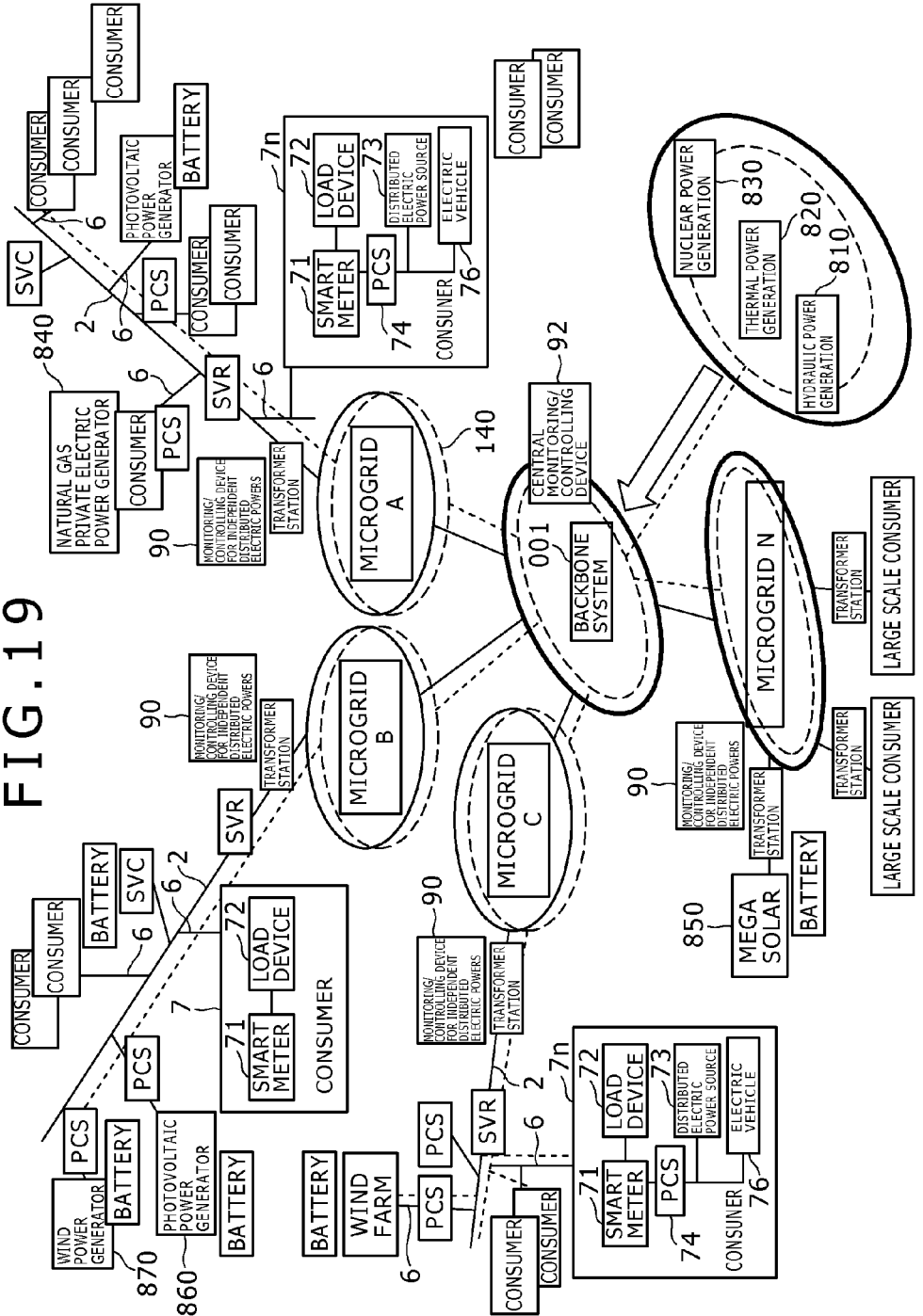
FIG. 19 is a diagram showing a configuration example of the entirety of a smart grid, into which an electric power system simulation device according to an embodiment of the present invention is incorporated, according to a third embodiment of the present invention.

FIG. 19 is a diagram showing a configuration example of the entirety of a smart grid, into which an electric power system simulation device according to an embodiment of the present invention is incorporated, according to a third embodiment of the present invention. Although examples based on control per "power distribution system" have been described in the first and second embodiments, the present invention is not limited in its application to the above system configurations, and the present invention can be applied to various electric power system configurations. The present invention can be applied to a system configuration based on control per microgrid. In an example shown in FIG. 19, a backbone system, which is coupled to a hydraulic power station, a thermal power station, and a nuclear power station, is coupled to microgrids A to N, and each microgrid includes a monitoring/controlling device for independent distributed electric powers 90. In this backbone system, a natural gas private electric power generator 840, a mega solar 850, a photovoltaic power generator 860, and a wind power generator 870 are installed as distributed electric power sources. In this case, targets to be controlled are not only electric power systems, but also all kinds of energy supply systems including a gas supply system line. Information about energy of each consumer 7 is collected through a smart meter. Generally speaking, a power distribution line is branched into a high-voltage system (6 kV) and low-voltage systems (100 V) whose voltages are obtained after the high voltage is stepped down by pole-mounted transformers. General consumers are coupled to the low-voltage systems, and commercial-scale utility consumers are coupled to the high-voltage system. Photovoltaic batteries (PV) are installed in both general consumers and commercial-scale utility consumers. When there are surplus electric powers that are unexpendable because of a large amount of PV generated electric energies in both sides, the generated electric energies may be output and sold to the system side. In other words, in the electric power adjustment, it also becomes a control target for a consumer to sell electric powers to business corporations in his own grid or to sell electric powers to other microgrids. It goes without saying that these pieces of information can be displayed on the display unit 170 and can be utilized as is the case with the first embodiment or second embodiment. In the case of the third embodiment, an electric power system control device 102 similar to that employed in the second embodiment will be employed.

FIG. 20 is a diagram showing examples of the functional blocks of a control unit of an electric power system control device 102 according to a third embodiment, and an example of a display method executed on the display unit. It is desirable that information displayed on the display unit 170 is provided not only to an operator who executes monitoring and controlling on an electric power system, but also to consumers in the corresponding microgrid to an allowable extent. In other words, the information displayed on the display unit 170 is processed, so that it becomes possible for the processed information to be browsed on the terminals 2012 of the consumers in the microgrid via a website 2000 and the Internet 2010. Information disclosed on the screens of the terminals 2012 can be provided as detailed information based on the actual condition of each microgrid, and if this information to which a message "try to save on electric power" or the like is attached is provided, it will be able to contribute to the useful utilization of electric powers and energies in the entirety of the corresponding region.

In addition, the utilization of the display function via a network makes it possible that the simulation result obtained from the second and third embodiments can be used not only for the display screen of a simulation device, but also for the display, and maintenance/management in various fields. For example, the terminal 2012 can be used in such a way that an operator, who is in charge of monitoring and controlling of an electric power system, can browse the display of the terminal 2012 at an arbitrary site via a communication network such as the Internet 2010. Alternatively, because a worker, who is in charge of maintenance and management of an electric power system, can do his/her work while comparing the browsing screen of the terminal 2012 with an actual device that is a browsing target, it can be said that the terminal 1012 can be utilized for the increase of work efficiency. As described above, to distribute the signal processing function of a simulator and the display function for displaying the simulation result with a network therebetween can bring about the following advantages. For example, as long as the simulator keeps "data format" for the results of processing, the configuration of a device that executes the processing can be arbitrarily selected, changed, or updated. For example, a simulation device according to this embodiment may be built using a datacenter or cloud computing that is globally spread on the Internet. On the other hand, it is also conceivable that a user accesses the simulation device according to this embodiment using a client such as an information terminal and a browser running thereon, and browses the simulation result, with the result that the user can utilize not only information about individual consumers, but also information about electric power systems all over the corresponding region. In other words, an arbitrary terminal including a display function can be selected as long as it can display the same data format. As a "data format" for realizing such a function distribution, hypertext markup language (HTML) for realizing the so-called web applications can be used.

Fourth Embodiment

Any of the electric power systems according to the above-described embodiments is made of wirings that are electric conductors along a route in reality. If the electric power system is built on the ground, cables are connected to support posts that are installed on the ground such as electric poles. If the electric power system is built under the ground, routes similar to underground tunnels are installed and cables are disposed in the routes. These routes can be displayed superimposedly onto a map that is based on a global geographic coordinate system using GPS and that is provided by a public institution or a private company, such as a Google map (registered trademark), a car-navigation map, or a satellite photograph. Because these maps are very widely used to show two-dimensional positional relations, it is sometimes desired in order to improve visibility that an electric power system, on which the positions of wirings, electric poles, underground cables, and the like are displayed, is displayed on these maps (referred to as real maps hereinafter), and additionally information about state quantities about the states of the electric power system are superimposedly displayed onto these maps. Whether such a display as above is preferred to or not sometimes depends on the objective, habit, practice, and the like of an observer.

As described above, the present invention is characterized in that it employs a coordinate system on a virtually made map (referred to as a virtual map hereinafter) in order to place value on the relations among electric power systems and energy systems, and includes display units referred to as display cells that have a function for displaying the relative positional relations on this virtual map. The electric power system diagram and the energy system diagram on the real system or on a simulator, which are shown in FIG. 2 and FIG. 3, have coordinate systems on virtual maps. However, the present invention does not exclude a display format based on a real map as described above. In order to make it possible that an electric power system diagram or an energy system diagram is displayed on a real map, and that operation inputs to such a diagram are accepted, a coordinate conversion function used for converting coordinates between the coordinate system of a virtual map and that of a real map, a database including map information, the street addresses of consumers, and the like become necessary. In addition, it is also possible to provide a switching means for switching the display of data about the same electric power system from cell-based display on a virtual map to map-based display on a real map and vice versa. As described above, displays that suit a wide variety of preferences of observers can be easily realized.

LIST OF REFERENCE SIGNS

1 . . . Transformer Station, 2 . . . Power distribution line, 3 . . . Switch, 4 . . . SVR, 5 . . . Pole-mounted transformer, 6 . . . Incoming line, 7 (7a to 7n) . . . Consumer, 10 . . . Power-distribution-system simulation device of simulation model unit, 11 . . . Simulation control unit, 12 . . . Simulation model, 13A to 13N . . . Electric power system, 14 . . . Network communication unit, 15 . . . Database, 16 . . . Input/output control unit, 17 . . . Operator terminal, 18 . . . Weather information provider, 20 . . . Control unit, 71 . . . Electric measuring vessel (smart meter), 72 . . . Load device, 73 . . . Distributed electric power source, 74 . . . PCS (power conditioning system), 75 . . . Battery, 76 . . . Electric vehicle, 80 . . . Consumer-load simulation unit, 90 . . . Distributed electric-power-source simulation unit, 100 . . . Electric power system simulation device, 102 . . . Electric power system control device, 131 . . . EMS, 132 . . . CEMS, 170 . . . Display screen 171 . . . First display area, 172 . . . Second display area, 173 (173A to 173C) . . . Third display area, 174 . . . Display selection menu, 175 . . . Electric power system and area selection menu, 176 . . . Displayable selection element, 177 . . . Time display column, 180 . . . Screen display control unit, 1110 . . . Power-distribution-system power flow calculation unit, 1120 . . . Power flow calculation/coordination unit, 1130 . . . Management unit for states of independent distributed systems, 1710 . . . Energy system diagram display function unit, 1711 . . . System line, 1712 . . . System line, 1713 . . . Display element, 1720 . . . Mapping item display function unit, 1721 . . . Cell area

The invention claimed is:

1. A display device of electric power system information comprising:
    a display device including a display screen; and
    a screen display controller programmed to control the display device,
    wherein the display screen includes a display area that is divided into a plurality of display cells each of which has a mapping function for showing relative positional relations,
    wherein the display device is configured to display
        an electric power system diagram that embodies the state of an electric power system, which is a monitoring target, on the display cells on the display screen,
        mapping display items in the background of the electric power system diagram using the display cells, and menus and icons, which are used for selecting the mapping display items, on the display screen, wherein the electric power system, which is the monitoring target, includes distributed electric power sources, wherein the mapping display items represent information of state quantities regarding the state of the electric power system, which is the monitoring target, the state quantities are superimposed onto the electric power system diagram using the display cells that display the relative positional relations, and the mapping display items are displayed per display cell with different colors in accordance with the values of the corresponding state quantities, and wherein the state quantities include voltage distribution, temperature distribution, solar radiation amount distribution, distributed electric power source distribution, and power consumption distribution per consumer, and predicted future values thereof.

2. The display device of electric power system information according to claim 1, wherein the electric power system includes a power distribution system having power distribution lines and incoming lines, wherein the mapping display items include information about the state quantities of the power distribution lines and information about positional relations of the power distribution lines, information about the state quantities of the incoming lines and information about positional relations of the incoming lines, and information about the state quantities of consumers connected to the incoming lines and information about positional relations of the consumers, wherein the state quantities of the consumers include information about the distributed electric power sources, wherein the display device displays the state quantities of the power distribution system on the electric power system diagram, and wherein the display device displays the state quantities about the power distribution lines, the incoming lines, and the consumers per display cell.

3. The display device of electric power system information according to claim 2, wherein the electric power system diagram displays the state of the electric power system, which is the monitoring target, in a hierarchical structure, and the electric power system comprises at least one high-voltage system, and a plurality of low-voltage systems belonging to the high-voltage system, wherein, in the lowest level of the hierarchical structure, one low-voltage system forming the power distribution system and a final consumer coupled to the low-voltage system are displayed so as to corresponds to each other one-on-one per display cell, and wherein, in the middle level of the hierarchical structure, information about the state quantities and information about the positional relations of the lowest level are displayed in a degenerate form.

4. The display device of electric power system information according to claim 2, wherein the display device has a function to superimposedly display the system lines of the electric power system and a plurality of display elements, which is used for selection of the genesis phenomena in the electric power system, onto the electric power system diagram, wherein at least one of the voltage, current, and phase of the electric system can be selected as a state of the electric power system, and wherein, on the basis of the fact that at least one of the display elements is selected, information included in the display element is superimposedly displayed onto the electric power system.

5. The display device of electric power system information according to claim 2, wherein the power distribution system, which is the monitoring target, is a power distribution system in an electric power system simulation device, and wherein the electric power system simulation device includes a simulation control unit, simulation models having the model of the electric power system, a database, and an operator terminal having the display screen.

6. The display device of electric power system information according to claim 5, wherein the power distribution system, which is the monitoring target, is an electric power system control device which takes control over a power distribution system of a real system and into which the electric power system simulation device is incorporated, and wherein the electric power system control device includes a real system online monitoring/controlling program and the operator terminal having the display screen, and is configured to be able to control the power distribution system of the real system which is a controlling target.

7. The display device of electric power system information according to claim 2, wherein, as for displaying the different colors, if the values of the state quantity colors are strong or high, the colors are displayed by warm colors, and if the values of state quantities are weak or low, the colors are displayed by cool colors.

8. The display device of electric power system information according to claim 2, wherein the power distribution system, which is a monitoring target, includes a controller that monitors and controls independent distributed electric powers, and wherein the mapping item display function unit displays SVRs or PCSs installed along the power distribution lines, and makes the displays of SVRs or PCSs function as icons for operation inputs.

9. The display device of electric power system information according to claim 1, further comprising a function for processing information displayed on the display device and a function for browsing the processed information via a communication network in a functionally-distributed way.

10. A display device of electric power system information comprising:

a display device including a display screen; and a screen display controller programmed to control the display device, wherein a microgrid, which is a monitoring target, includes a controller that monitors and controls independent distributed electric powers, wherein the display screen includes a display area that is divided into a plurality of display cells each of which has a mapping function for showing relative positional relations in the microgrid, wherein the display device is configured to display an electric power system diagram that embodies the state of an electric power system in the microgrid on the display cells on the display screen, mapping display items in the background of the electric power system diagram using the display cells, and menus and icons, which are used for selecting the mapping display items, on the display screen and for accepting selection operations to the menus and icons, wherein the microgrid, which is the monitoring target, includes distributed electric power sources, and wherein the mapping display items represent information of state quantities regarding the state of the electric power system of the microgrid, which is the monitoring target, the state quantities are superimposed onto the electric power system diagram using the display cells that display the relative positional relations, and the mapping display items are displayed per display cell with different colors in accordance with the corresponding values of state quantities;

wherein the state quantities include voltage distribution, temperature distribution, solar radiation amount distribution, distributed electric power source distribution, and power consumption distribution per consumer, and predicted future values thereof.

11. The display device of electric power system information according to claim 10, wherein the electric power system of the microgrid includes a power distribution system having power distribution lines and incoming lines, wherein the mapping display items include information about the state quantities of the power distribution lines and information about positional relations of the power distribution lines, information about the state quantities of the incoming lines and information about positional relations of the incoming lines, and information about the state quantities of consumers connected to the incoming lines and information about positional relations of the consumers, wherein the state quantities of the consumers include information about the distributed electric power sources, wherein the display device displays the state quantities of the power distribution system on the electric power system diagram, and wherein the display device displays the state quantities about the power distribution lines, the incoming lines, and the consumers per display cell.

12. A display method of electric power system information, the display method being executed by a display device including a display screen; and a screen display controller that controls the display device, the method comprising:

locating a first display area in a middle part of the display screen and a second display area in a peripheral part of the display screen, dividing the first display area into a plurality of display cells each of which has a mapping function for showing relative positional relations, displaying, in the first display area, an embodied energy system diagram and a plurality of spots, which are selectably disposed on the energy system diagram, displaying, in the second display area, an energy distribution between at least two points selected out of the spots on the energy system diagram, and displaying, in the first display area, energy states around the plurality of spots with different colors in accordance with the corresponding values of state quantities in the background of the energy system diagram using the plurality of display cells, wherein the state quantities are superimposed onto the energy system diagram using the display cells that display the relative positional relations, wherein the state quantities include voltage distribution, temperature distribution, solar radiation amount distribution, distributed electric power source distribution, and power consumption distribution per consumer, and predicted future values thereof.

13. The display method of electric power system information according to claim 12, wherein at least a voltage distribution, a temperature, a solar radiation amount are selectably displayed on a display selection menu as an item to be displayed on the display cells in the first display area, and wherein the energy states around the plurality of spots are displayed in response to an item selected on the display selection menu using the plurality of display cells.

14. The display method of electric power system information according to claim 13, wherein, as a display method for displaying the energy system diagram on the display cells, there are two methods that can be switched to each other using the display selection menu, one is a method in which a real system diagram, which is processed by an electric power system control device and an electric power system simulation device, and the energy system diagram on a simulator are displayed on the basis of a coordinate system on a virtual map, and the other is a method in which a real system diagram on the virtual map and an electric power system diagram on the simulator are respectively converted into a real system diagram and an electric power system diagram on the coordinate system of a real map to be displayed.

* * * * *